(12) United States Patent
Wegeng et al.

(10) Patent No.: US 7,270,905 B2
(45) Date of Patent: Sep. 18, 2007

(54) MICROSYSTEM PROCESS NETWORKS

(75) Inventors: Robert S. Wegeng, Richland, WA (US); Ward E. TeGrotenhuis, Kennewick, WA (US); Greg A. Whyatt, West Richland, WA (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 11/241,575

(22) Filed: Sep. 30, 2005

(65) Prior Publication Data

US 2006/0034754 A1   Feb. 16, 2006

Related U.S. Application Data

(62) Division of application No. 09/588,999, filed on Jun. 6, 2000.

(51) Int. Cl.
*H01M 8/04* (2006.01)

(52) U.S. Cl. .............................. 429/26; 429/17; 429/20

(58) Field of Classification Search ................... 429/20
See application file for complete search history.

(56) References Cited

U.S. PATENT DOCUMENTS

| | | | | | |
|---|---|---|---|---|---|
| 4,593,534 | A | * | 6/1986 | Bloomfield | 62/201 |
| 5,345,786 | A | * | 9/1994 | Yoda et al. | 62/476 |
| 5,811,062 | A | * | 9/1998 | Wegeng et al. | 422/129 |
| 5,885,727 | A | * | 3/1999 | Kawatsu | 429/17 |
| 2002/0011330 | A1 | * | 1/2002 | Insley et al. | 165/133 |

* cited by examiner

*Primary Examiner*—Jonathan Crepeau
*Assistant Examiner*—Tony Chuo
(74) *Attorney, Agent, or Firm*—Derek Maughan; Frank Rosenberg

(57) ABSTRACT

Various aspects and applications of microsystem process networks are described. The design of many types of Microsystems can be improved by ortho-cascading mass, heat, or other unit process operations. Microsystems having energetically efficient microchannel heat exchangers are also described. Detailed descriptions of numerous design features in microcomponent systems are also provided.

19 Claims, 28 Drawing Sheets
(1 of 28 Drawing Sheet(s) Filed in Color)

☒ Etch Area to .007"-.001"
☒ Through Holes
☐ Not Etched

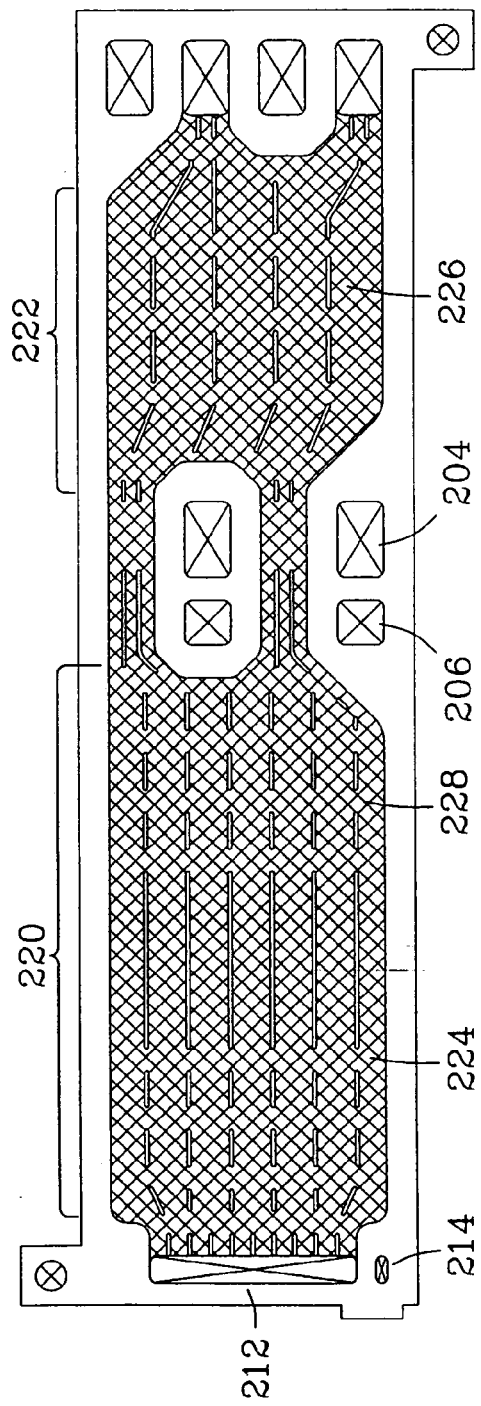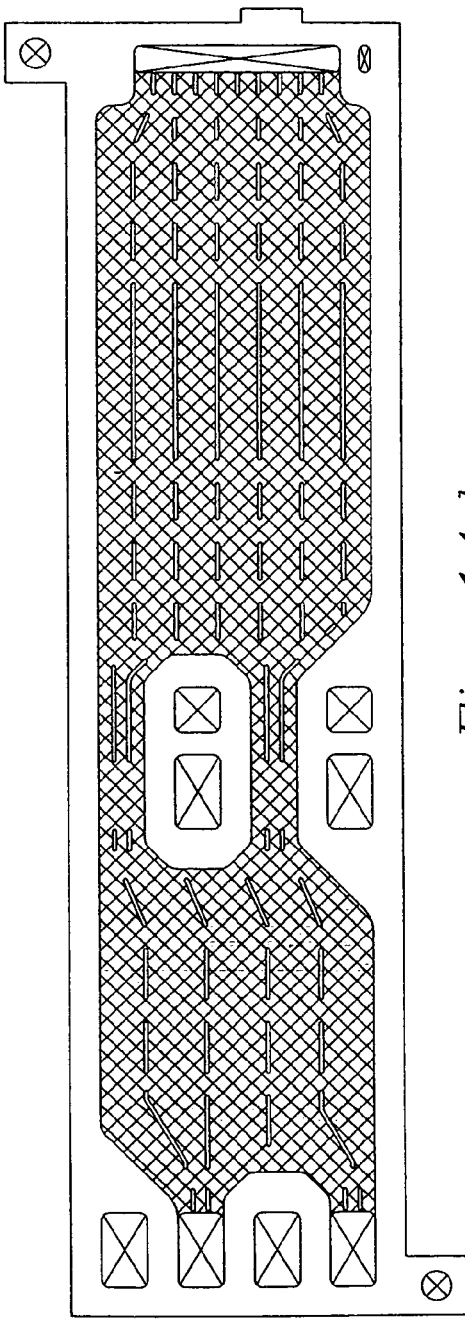
Fig. 14c
Fig. 14d

MICROSYSTEM PROCESS NETWORKS

RELATED APPLICATION

This application is a divisional of U.S. patent application Ser. No. 09/588,999, filed Jun. 6, 2000, which is incorporated herein as if reproduced in full below.

This invention was made with Government support under Contract DE-AC0676RLO1830 awarded by the U.S. Department of Energy. The Government has certain rights in the invention.

FIELD OF THE INVENTION

The present invention relates to microchannel devices and particularly microchannel devices that are capable of unit process operations involving the transfer of mass or heat.

BACKGROUND OF THE INVENTION

Systems involving heat or mass transfer are crucial to our industrialized society. Examples of such systems include: power generation, chemical processing systems, and heating and cooling systems. For more than 100 years, scientists and engineers have endeavored to increase the efficiency or reduce the cost of these systems.

Battelle, Pacific Northwest National Laboratories and others have been using microtechnology to develop Microsystems for carrying out processes that had previously been conducted using far larger equipment. These systems, which contain features of 1 millimeter (mm) or less, may potentially change heat and mass transfer processing in ways analogous to the changes that miniaturization have brought to computing. Microsystems can be advantageously used in small scale operations, such as in vehicles. Microsystems that can be economically mass-produced can be connected together to accomplish large scale operations.

The production of hydrogen from hydrocarbon fuels, for use in fuel cells, are one example of an application that has been proposed for microsystems. Fuel cells are electrochemical devices that convert fuel energy directly to electrical energy. For example, in a process known as steam reforming, a microsystem can convert a hydrocarbon fuel (or an alcohol such as methanol or ethanol) to hydrogen and carbon monoxide. The hydrogen is fed to a fuel cell that reacts the hydrogen and oxygen (from the air) to produce water and an electric current. The CO could, in a reaction known as the water gas shift reaction, be reacted with water to produce additional hydrogen and carbon dioxide. Thus, fuel cells offer many potential advantages over conventional internal combustion engines—fuel cells can be more energy efficient and they do not produce nitrogen oxides and ozone that are the primary unhealthful components of smog.

Despite long and intensive efforts, there remains a need for energy efficient and cost effective systems for carrying out operations involving heat or mass transfer. There is also a need for compact systems or microcomponent systems for conducting processes that are conventionally carried out on a larger scale. This patent describes new solutions for more efficient and cost-effective systems utilizing microcomponent technology:

SUMMARY OF THE INVENTION

In a first aspect, the present invention provides a microcomponent apparatus for conducting unit operations comprising a microcomponent device having a first inlet, first exit, a first array of microchannels, and a second array of microchannels. During operation, a stream enters the first inlet of the microcomponent device and is distributed among the first array of microchannels and a first unit operation is performed on the stream. The stream exits through the first exit and exits the microcomponent device. A processing device is connected to the first exit of the microcomponent device. The processing device is capable of modifying the stream by a second unit operation. An outlet of the processing device is connected to a second inlet of the microcomponent device through a second inlet and the second array of microchannels is connected to the second inlet and a second exit is connected to the second array of microchannels. During operation, the stream re-enters the microcomponent device and is distributed among the second array of microchannels where a third unit operation is performed on the stream, and the stream exits through the second exit and exits the microcomponent device. In a preferred embodiment, the third unit operation is the same as the first unit operation—this is an example of ortho-cascading. The invention also includes methods that use the microcomponent apparatus in the manner described.

In another aspect, the invention provides a microchannel device comprising: a first zone, wherein during operation, at least one unit process operation is performed, and that, during operation, functions at a first temperature; a second zone that, during operation, functions at a second temperature; wherein the first temperature is different than the second temperature; and a microchannel heat exchanger that is disposed between the first zone and the second zone. During operation, a stream flows from the second zone through the microchannel heat exchanger to the first zone and subsequently flows back through the microchannel heat exchanger to the second zone. Also, during operation, within the microchannel heat exchanger, heat is exchanged between the stream flowing from the second zone to the first zone and the stream flowing from the first zone to the second zone; and the heat exchanger has a thermal power density of at least 0.6 W per cubic centimeter and an exergetic efficiency of at least 80%. The invention also includes methods that use the microchannel device in the manner described. In a preferred embodiment, the heat exchanger in the above-described microchannel device has an exergetic efficiency of at least 80% (preferably 85 to 95%) when the first zone is at a temperature of 600° C. and the second zone has a temperature of 200° C.—this does not mean that the apparatus is defined to operate at these temperatures, rather these temperatures provide a precise temperature for testing apparatus for exergetic efficiency.

In another aspect, the invention provides a microstructure architecture comprising at least two layers: a first layer comprising a continuous flow microchannel, and a second layer adjacent the first layer that comprises at least one microchannel. The first layer and the second layer cooperate to form at least two unit operations, and the flow microchannel forms at least a portion of the at least two unit operations. Preferably, the flow microchannel is substantially straight. In one preferred embodiment, the two unit process operations are heating a gas and vaporizing a liquid. In another preferred embodiment, the flow microchannel forms at least a portion of at least three unit operations.

In a further aspect, the invention provides microchannel apparatus in which the microchannel walls have gaps that allow pressure to equalize among the microchannels. In another aspect, the invention provides a microcomponent apparatus that contains a catalyst chamber in which there are upper and lower flow paths separated by a space, and upper and lower catalyst supports. The upper catalyst support is disposed substantially in the upper flow path, and the lower catalyst support is disposed substantially in the lower flow path.

In yet another aspect, the invention provides a microchannel apparatus comprising a header, at least two flow microchannels, and at least two orifices. Each orifice connects the header with each flow microchannel. The ratio of the cross-sectional area of each orifice to the cross-sectional area of the flow microchannels connected to said orifices is between 0.0005 and 0.1, more preferably between 0.001 and 0.05. This apparatus is especially useful as a water vaporizer.

In still another aspect, the invention provides a method of exchanging heat in a microchannel device, in which a first stream in a microchannel exchanges heat with a second stream, wherein the first stream remains in the microchannel and, subsequently, the first stream exchanges heat with a third stream without leaving the microchannel.

In a further aspect, the invention provides a method of conducting unit operations in microcomponent apparatus comprising: performing a first unit operation on a first stream in a first microcomponent cell, subsequent to the first unit operation, performing a second, discrete unit operation on the first stream to make a modified stream, then in a second microcomponent cell, performing the first unit operation on the modified stream, to accomplish a single unit operation for the same purpose as a the first unit operation on the first stream. In a preferred embodiment, the first stream is a heat exchange fluid and the first unit operation in a microcomponent cell is heat exchange, with heat being transferred from the first stream to provide heat for an endothermic process; where the second unit operation modifying first stream comprises reheating the first fluid by reheating from a heat source or by adding additional fuel or oxygen and performing combustion reactions. Examples of endothermic processes include drying, boiling, evaporation, endothermic chemical reactions, and desorption. In another preferred embodiment, heat is transferred for an exothermic process, such as an exothermic chemical reaction, or a sorption process such as a gas into a liquid or a gas onto a solid. In another preferred embodiment, the first unit operation comprises a chemical reaction, such as steam reforming, and the second unit process comprises-mass transfer, such as adding additional hydrocarbon reactant to first stream.

In another aspect, the invention provides a microcomponent device for conducting unit operations comprising: a first microcomponent device having a first inlet, first exit, first header, a first array of microchannels and a second array of microchannels. The first inlet is connected to the first array of microchannels. The first array of microchannels are connected to a first exit that is connected to the first header. During operation, a first stream enters the first inlet of the first microcomponent device and is distributed among the first array of microchannels and a first unit operation is performed on the first stream, the first stream then passes through the first exit into the first header. The first header being is capable of modifying the first stream by a second unit operation. The first header is connected to a second array of microchannels within the first device. During operation, the first stream enters the first microcomponent device and is distributed among the second array of microchannels wherein the first unit operation is again performed on the first stream.

The invention further provides a method of transforming exergy in a microcomponent device in which a portion of the chemical exergy of a first stream is converted to physical exergy and a portion of this physical exergy is transferred to chemical exergy in a second stream. The first stream and the second stream do not mix. The step of transferring at least a portion of said physical exergy to chemical exergy in a second stream has a an exergetic efficiency of at least 50%; and the step of converting at least a portion of the first chemical exergy to physical exergy has a thermal power density of at least 0.6 watts per cubuc centimeter.

The invention also provides a method of designing a microcomponent apparatus, comprising using exergetic analysis to analyze a system having microcomponents that are involved in at least one unit process operation; and designing a change in the microcomponent apparatus based on that exergetic analysis. The exergy analysis can be used to identify the causes and calculate the magnitude of exergy losses. The invention also provides a chemical process system comprising: a fuel cell; a heat pump; and a chemical conversion unit capable of producing fuel for the fuel cell. During operation, the fuel cell produces heat at a first temperature, and the heat pump increases the temperature of the heat to a higher temperature. Heat from the heat pump is transferred to the chemical conversion unit. Preferably, the heat pump contains a compressor. While the invention recognizes that there are numerous approaches to exergetic analysis, "exergetic efficiency" of a specified percent refers to the exergetic efficiency as calculated by the specific method described herein.

The invention, in various aspects and embodiments can provide numerous advantages including: reduced exergy destruction, higher power densities, process intensification, improved energetic efficiency, reduced costs of construction and operation, new abilities to perform operations in small volumes, relatively high flow rates and reduced temperatures, reductions in size, and improvements in durability.

The subject matter of the present invention is distinctly claimed in the concluding portion of this specification. However, both the organization and method of operation, together with further advantages and objects thereof, may further be understood by reference to the following description taken in connection with accompanying drawings wherein like reference characters refer to like elements.

GLOSSARY OF TERMS

A "cell" refers to a separate component, or a volume within an integrated device, in which at least one unit operation is performed. In preferred embodiments, the cell has a width less than about 20 cm, length less than about 20 cm, and height less than about 3 cm.

"Flow microchannel" refers to a microchannel through which a fluid flows during normal operation of an apparatus.

"Microchannel" refers to a channel having at least one dimension that is about 2 mm or less, preferably 1 mm or less. The length of a microchannel is defined as the furthest direction a fluid could flow, during normal operation, before hitting a wall. The width and depth are perpendicular to length, and to each other, and, in the illustrated embodiments, width is measured in the plane of a shim or layer.

"Microcomponent" is a component that, during operation, is part of a unit process operation and has a dimension that is 2 mm or less, preferably 1 mm or less. "Microcomponent cell" is a cell within a device wherein the cell contains microcomponents.

"Ortho-cascading" refers to a process in which first unit operation is performed on a first stream in a first microcomponent cell, subsequent to the first unit operation, a second, discrete unit operation is performed on the first stream to make a modified stream, then in a second cell, the first unit operation is again performed on the modified stream, to accomplish a single unit operation. The first unit operations in the first and second cells has the same purpose.

"Unit process operation" refers to an operation in which the chemical or physical properties of a fluid stream are modified. Unit process operations (also called unit operations) may include modifications in a fluid stream's temperature, pressure or composition. Typical unit process operations include pumping, compressing, expanding, valving, mixing, heating, cooling, reacting, and separating.

"Thermal power density" refers to the heat transfer rate divided by volume of the device, where volume of the device is the sum of stream volume involved in heat transfer and the walls between the streams, calculated in the portion of the device where there is a significant amount of heat transfer (thus excluding long stretches of piping, etc.).

BRIEF DESCRIPTION OF THE DRAWINGS

The patent or application file contains at least one drawing executed in color. Copies of this patent with color drawings will be provided by the Office upon request and payment of the necessary fee.

FIG. 14c is a top down view of a heat exchanger shim in a microchannel recuperator.

FIG. 14d is a bottom up view of a heat exchanger shim in a microchannel recuperator.

DETAILED DESCRIPTION

Figure 1:
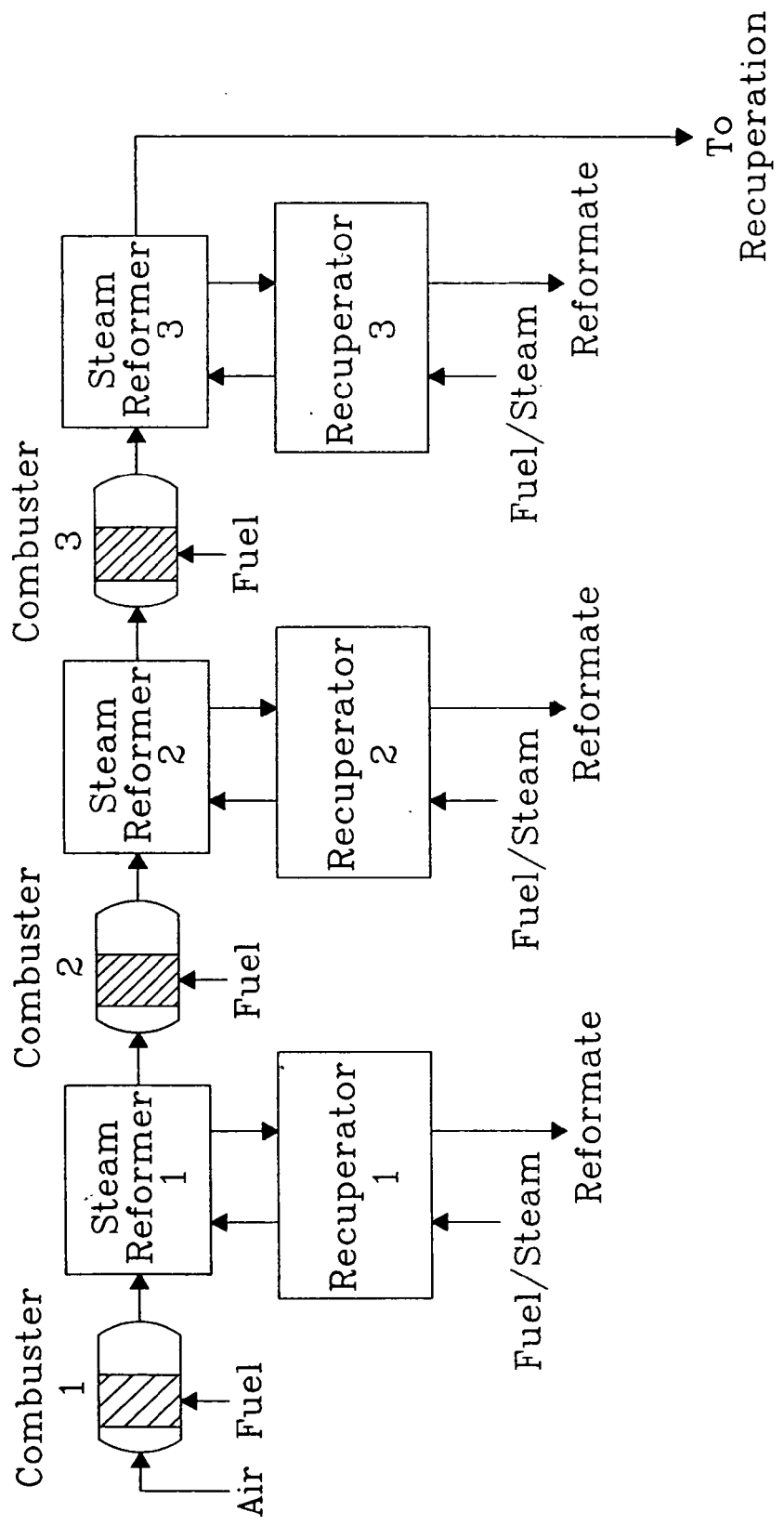
FIG. 1 illustrates a hot gas reinjection scheme for reforming hydrocarbons.

The invention involves a core of closely related concepts that are perhaps most easily understood by dividing the descriptions into the three aspects of: ortho-cascading, exergetic efficiency, and system construction. In many embodiments, these are closely related concepts. For example, ortho-cascading can contribute to exergetic efficiency, and various preferred embodiments of system constructions can be ortho-cascaded, exergetically efficient, or both. Some preferred embodiments of each of these aspects are discussed below.

Ortho-Cascading

Conventional process flowsheet development involves identifying a sequence of unit operations, such as chemical reactors, separations, and heat exchangers, which are interconnected by process streams to form a process train. At the most simplistic level, raw materials are fed to the process at one end, the material passes through a network of unit operations, and products come out the other end. This inherent two-dimensional structure gives rise to the terms 'up-stream' and 'down-stream' in reference to processes. Superimposed on this inherent two-dimensional structure are concepts of recycle and multiple stages. Recycle streams flow opposite to the general direction of material flow through the system; they can flow from a down-stream process to an up-stream process or back to the inlet of the generating process. Multiple stages generally refers to cases where a single unit operation is accomplished in a sequence of steps, such as a series of continuous stirred tank reactors (CSTR) or a train of mixer-settlers in solvent extraction.

Conventional flowsheet development is driven largely by economies of scale. There may be rare cases where an engineer would choose to divide up a unit operation into a sequence of parallel vessels or trains, such as adding parallel trains in a capacity expansion. Dividing up a unit operation into a sequence of parallel trains substantially increases the cost of conventional process technology. This is in marked contrast to microtechnology where the smallest building block is a microchannel, which are assembled into arrays that form cells. Practical constraints, desired operational characteristics, and flow distribution issues typically limit the size of a single cell. Consequently, multiple cells can be included in a device with multiple devices in parallel trains to achieve the necessary throughput.

This invention recognizes and takes advantage of the inherent modularity of the microtechnology in process network development. The modularity allows a system designer to mentally replace a single icon representing a single unit operation on a flowsheet with a stack of icons representing parallel cells or devices, giving the flowsheet a three dimensional quality. Conceptually, the third dimension gives unique opportunities for ortho-cascaded networks, which are in essence combinations of parallel, serial and cross-current processing within arrays of the microchannel architecture building blocks. This concept can be extended to unlimited combinations of co-current, counter-current, and crosscurrent processing for high efficiency heat transfer, mass transfer, and/or chemical reactions. As an example, this high degree of versatility coupled with the high efficiency and high effectiveness achieved in microchannel heat exchangers, can give rise to high fidelity heat exchange networks that minimize irreversible losses.

This three-dimensional quality of flowsheets based on microtechnology can be farther exploited by integrating two unit operations. Returning to the metaphor of the stack of icons representing a unit operation, this aspect would essentially 'shuffle the decks of two or more unit operations. The same approach for 'wiring' this combined stack with combinations of co-current, counter-current, and crosscurrent flow streams applies again. For example, two consecutive reactions could be carried out with one reactant stream flowing through a series of interleaved, alternating reactor cells, while some of a second reactant could be added to each reactor pair in parallel, thereby giving rise to a crosscurrent configuration. Given the ability to achieve non-equilibrium product mixtures (e.g., reductions in the formation of secondary reaction products) with extremely fast residence times in microchannels, a three-dimensional process design approach will open up new opportunities for managing selectivity while achieving high conversion. The same three-dimensional integration approach is possible for other combinations of reactors, separations, and heat exchange.

One subclass of ortho-cascaded microsystem process networks is the management of thermal energy. In this subclass, the main advantage is the distribution of energy addition or energy removal. Some possible benefits include reducing exergy losses by reducing required temperature driving forces, enabling use of lower temperature materials of construction by lowering temperatures, and increased energy efficiency by facilitating better heat integration.

Figure 2:
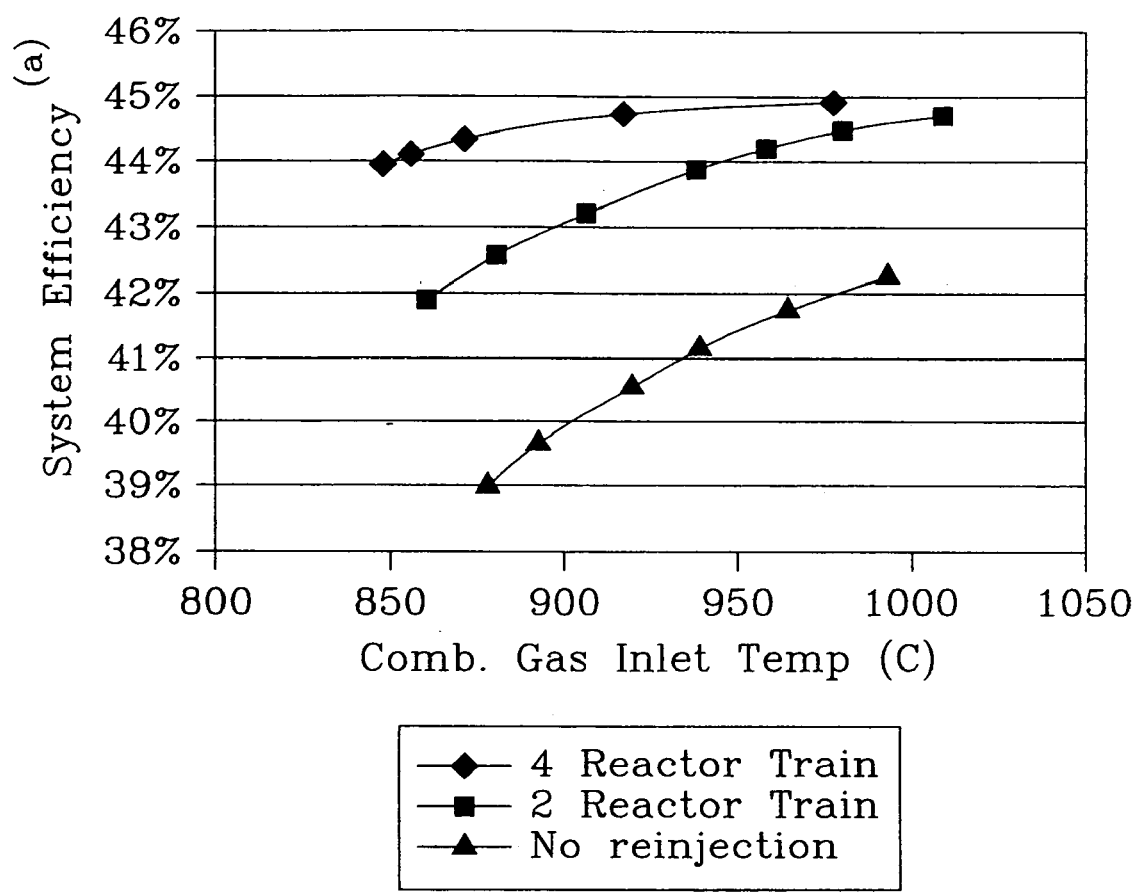
FIG. 2 illustrates representative increases in overall system efficiency of a fuel cell power generation system operated using reformate produced utilizing hot gas reinjection.

One example of a practical application of the subject invention is illustrated in FIG. 1 for steam reforming of hydrocarbons to produce synthesis gas, consisting predominantly of hydrogen, carbon monoxide, and carbon dioxide. This is a highly endothermic reaction, which is conventionally operated at temperatures ranging from less than about 500° C. for methanol to temperatures over 1000° C. for methane. Microchannel reactors having reactor channels interleaved with heat exchange channels for delivering heat directly to where the reaction is occurring, achieves more isothermal operation. The heat can be delivered using a gas stream typically heated by combustion to a temperature above the reformer operating temperature prior to entering the reactor. The heat duty required by the reactor is satisfied by the combination of hot gas mass flow rate, combustion operating temperature, and the heat exchange effectiveness in the reactor. This can lead to a trade-off between having a higher combustion temperature versus a higher mass flow. High temperatures can require that the combustor and reactor be constructed from expensive high-temperature alloys and lead to larger temperature gradients within the reactor, while higher mass flow causes to energy inefficiencies and larger devices and/or higher pressure drops. A 3-dimensional flowsheet is constructed to mediate this trade-off between high temperature and high mass flow. The same hot gas stream is used to heat multiple reactor cells that are operating in parallel by injecting and combusting additional fuel before each cell in order to increase the temperature before entering the cell. The end result is that the maximum temperature of the combustion gas stream is lowered without having to increase mass flow. Not only does this allow lower temperature alloys to be used, but also improves overall system efficiency as depicted in FIG. 2. Another potential benefit is better heat transfer by reducing the gas velocity, thereby allowing for smaller devices with lower pressure drop.

A second subclass of ortho-cascaded microsystem process networks is the management of mass flows. Here, the addition or removal of mass is distributed within the network. Advantages from using ortho-cascading of mass flows can include adjustment of reactant ratios, enhanced mass transfer within a unit operation, or avoidance of thermodynamic pinch-points.

An example of practical utilization of this subclass is adjustment of the ratio of reactants entering a reactor. Potential side reactions in steam reforming of hydrocarbons are coke formation from cracking or from carbon monoxide. One approach for controlling these side reactions is to add steam in excess of the stoichiometric requirement; steam to carbon ratios in the feed are typically 3:1 or higher. The modularity of microchannels facilitates the ability to operate at a higher effective steam to carbon ratio by distributing the injection of hydrocarbon reactant. For example, starting with a steam to carbon ratio of 6:1, the ratio will rise with conversion to 11:1 at 50% conversion of hydrocarbon to carbon monoxide (assuming no water shift to $CO_2$ or methane formation). Adding 42% more hydrocarbon at this point, lowers the steam to carbon ratio back to 6:1. Repeating this process two more times after achieving 50% conversion (adding 38% and 35% more hydrocarbon for the next two repeats to reduce the ratio back to 6:1) and ending with 90% conversion of the hydrocarbon in the last step, the overall ratio of steam added to hydrocarbon added is 3.34:1. However, the lowest steam to carbon ratio actually encountered by the process is 6:1, and the overall hydrocarbon conversion is 96%. Intermediate hydrocarbon injection could be achieved between cells operated in series or within a single cell having multiple passes. In the latter case, injection could occur in the header region between passes. Several key attributes of microchannel reactor technology make this concept practicable. First, the modularity of microchannel reactors enables injection of reactants into the reaction mixture at multiple points without requiring additional hardware units. Second, the short residence times achieved in microchannel reactors implies that distributing reactant addition along the flow path does not severely penalize overall reaction kinetics and so the penalty in increasing the total hardware volume is minimized.

Ortho-cascading can also be used to advantage in microsystem process networks in the management of the integration of multiple unit operations. In addition to integrating heat and mass transfer, other examples of unit operations that can be cascaded include pumping, compressing, and mixing. Advantages from using ortho-cascading of unit process operations can include equilibrium shifting, optimization of operating conditions, adjustment of operating conditions, to name just a few.

Figure 3:
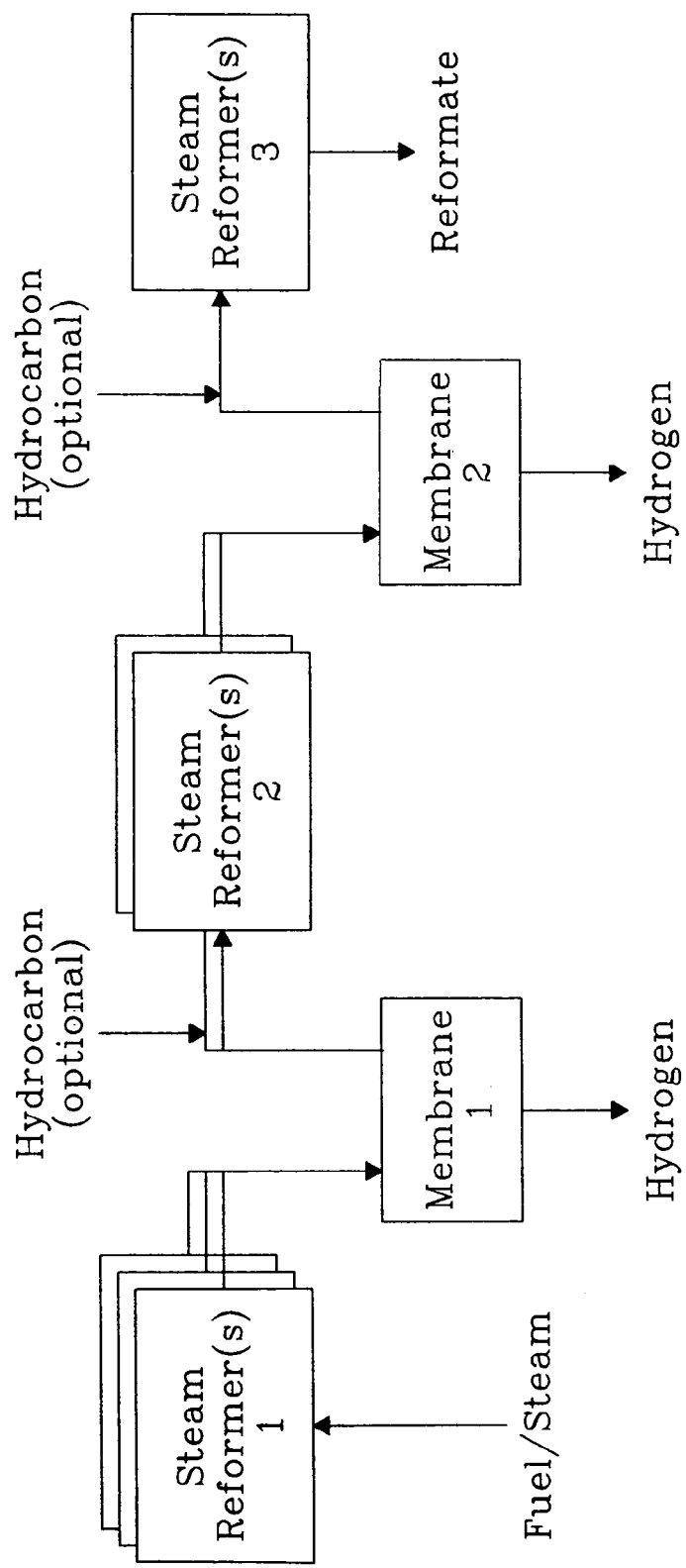
FIG. 3 is a schematic diagram illustrating integration of steam reformer reactors and hydrogen separation membranes.

The following example illustrates the concept of integrating two unit operations. Again using steam reforming of hydrocarbons as a representative process, the reforming reactor is integrated with a separation device, such as a hydrogen separation membrane as shown in FIG. 3. The overall concept is to improve conversion and selectivity by removing one of the products between reactor cells that are operating in series. The example in FIG. 3 shows selective removal of hydrogen using membranes, such as the high temperature palladium membranes, between reactor cells operating in sequence. Removing the hydrogen causes equilibrium to shift towards higher hydrocarbon conversion, induces higher water gas shift toward $CO_2$, and suppresses methane formation. FIG. 3 illustrates the high level of versatility in modular microchannel architecture. Because the volumetric flow is decreasing as hydrogen is removed, the number of parallel cells can be reduced after each separation step. Furthermore, high conversion is not needed by any given reactor in order to achieve high overall conversion. This illustrates the ability to combine series and parallel processing in order to optimize overall size and performance.

Ideally, methanol steam reforming is performed at lower temperatures, typically 250° C. to 300° C., while gasoline reforming is done at 650° C. to 800° C. and methane at even higher temperatures. By incorporating compact, high-efficiency microchannel recuperators into the concept depicted in FIG. 3, the reactors and membranes can be operated at very different temperatures without incurring a severe energy efficiency penalty. Alternatively, employing low temperature polymer hydrogen membranes would reduce the maximum membrane operating temperature to about 150° C., which could only be efficiently accomplished using recuperators. By incorporating heat exchangers, the 3D flowsheeting is employed to integrate three unit operations, reactors, separations, and heat exchange.

All of the concepts described above for steam reforming hydrocarbons could be incorporated in a wide variety of combinations and processes. FIG. 3 illustrates the option of integrating membrane separations and distributing the addition of hydrocarbon to adjust steam to carbon ratio. Thus, while three sample embodiments of ortho-cascading are illustrated for steam reforming, many other microchemical and thermal systems are part of the present invention.

Various preferred embodiments involving: size of components, temperature ranges, flow rates, pressures, 3-dimensionality of unit operations, and specific combinations of unit operations can be seen in the Figures, examples and attached claims.

Exergetic Efficiency

In thermodynamic terms, "work" can be produced when two systems (or a system and its surroundings), that are not in equilibrium with one another, are allowed to come into complete or partial equilibrium with one another. The "exergy" content of a stream, or of a system, is a quantitative measure of the maximum amount of work that could be extracted from this process, and accordingly represents the amount of work that could be produced if the process is thermodynamically "reversible".

The terms exergy, exergy destruction, and exergetic efficiency are performance-related parameters that help to describe the efficiency with which energy transformation is accomplished within components of the system.

Exergy destruction is the amount of potential work (exergy) that is lost as irreversibilities occur during an exchange or energy. Exergy can be destroyed through a number of mechanisms, including chemical reactions (e.g., combustion), through heat transfer across a temperature difference, through mixing, through expansion and through friction (e.g., fluid pressure drop).

Exergetic efficiency is calculated as the fraction or percentage of the exergy supplied to a system (or a component) that is recovered in the product of the system (or component) Exergetic efficiency is also referred to in some textbooks as the Second Law efficiency, since it is more closely tied to the Second Law of Thermodynamics than to the First Law. More specifically, the exergetic efficiency of a component, subsystem, or system is the ratio of the change in the exergy content of the product stream(s) to the change in the exergy content of the exergydriving streams (i.e., the streams which deliver exergy to the process). For terrestrial applications, the surrounding environment is taken to be standard temperature (298 K) and pressure (1 bar). When nonsteady state conditions are encountered, the change in exergy of the hardware system must also be included in the calculation. For purposes of the invention, exergetic efficiency is calculated as illustrated in the examples.

Since exergy is not conserved in any real systems, the exergetic efficiency of a component, subsystem or system can never equal 100%. There are cases where the exergetic efficiency can be less than 0%, however, such as when the exergy of a product stream is less than the exergy of the feed streams. This case is document in Szargut (1984) for an ammonia production plant.

There can be a substantial advantage for an engineer to using the Second Law for efficiency considerations. First, efficiency calculations based on the Second Law are often a better measure of the value (or quality) of the energy potential of a fuel or an stream's enthalpy. As noted by Gaggioli and Petit (1997), "the real commodity of value, which the layman calls energy, isn't the same thing as the energy of science. Rather, the energy commodity is called available energy, or potential energy, useful energy."

The First Law of Thermodynamics is essentially a conservation law. Expressed in mathematical form, the First Law states that in any energy transformation process, energy is always conserved. In contrast, the Second Law of Thermodynamics is essentially an expression of the effect of irreversibilities on any transformation process, with perhaps the most commonly used parameter being entropy. The Second Law is also recognized as an indicator that any energy flow can also be expressed qualitatively in terms of its ability to effect change (e.g., perform work), and that this quality can be degraded or destroyed by the steps in practical processes. Exergy has been proposed by thermodynamicists as the quantification of that quality; that is, the exergy content of any stream is a measure of the ability of the energy in that stream to perform work or create change.

Exergy analyses recognize that there is potential work available from exothermic chemical reactions, likewise that it is exergy that drives endothermic chemical reactions, and individual reactants and products are assigned "chemical exergy" values. Typically, a flowstream will have a chemical exergy quantity, that is a function of the chemicals in the stream and its flowrate, and a physical exergy quantiy, that are a function of the temperature, pressure, and flowrate of the stream. These values are also a function of the temperature, pressure and constitutents of the "surrounding environment" of the system. For a reactor, exergetic efficiency calculations include the efficiency with which exergy is transformed from one form to another.

More generally, the exergy (E) of a stream is typically described as being composed of four components (absent nuclear, magnetic, electrical and interfacial effects), separately described as physical exergy ($E_{PH}$), kinetic exergy ($E_{KE}$), potential exergy ($E_{PE}$) and chemical exergy ($E_{CH}$).

$$E = E_{PH} + E_{KE} + E_{PE} + E_{CH}$$

The kinetic and potential exergy terms are equivalent to kinetic and potential energy, and can typically be assumed to be small compared to the other terms. However, this assumption needs to be carefully considered in each case, as there are notable exceptions.

The physical exergy term is typically calculated based upon methods described in Szargut et.al. Exergy Analysis of Thermal, Chemical, and Metallurgical Processes, Hemisphere Publ. Co. (1988), Moran (1982), and Bejan et.al., Thermal Design Optimization, Wiley-Interscience Publication (1996), and is mathematically based upon the following expression for fluid flow within an open system:

$$E_{PH} = H - H_0 - T_0(S - S_0)$$

where H and S represent the enthalpy and entropy of the fluid stream at the point of interest, $H_0$ and $S_0$ represent the enthalpy and entropy of the same stream if brought to the same temperature and pressure as the environment ($T_0$ and $P_0$). Derivations of this expression are found in a number of texts, including those already mentioned. Note that this equation is similar to, but should not be confused with, the Gibbs function for free energy.

The value for the chemical exergy of a stream is typically assigned from a table of chemical exergies, based upon consideration of the surrounding environment. Substantial work has been done to define reference chemical exergies for a number of chemicals in terrestrial settings, and the reader is again referred to the previously cited literature for additional information.

It is perhaps instructive to examine the method of exergy analysis for a simple case, where a hot gas is used for the purpose of heating a cool gas. In this example, we will assume that a recuperative heat exchanger is operating with two fluid streams, each consisting of the same ideal gas with the same mass flow rates, and with constant specific heats and no chemical reactions. Likewise, in this example, we will assume that there are no significant changes in potential energy or kinetic energy of either gas stream.

In this case, the previous equation for physical exergy can be restated as follows:

$$E_{PH}/mc_pT_0 = [(T/T_0) - 1 - \ln(T/T_0)] - [\ln(P/P_0)^{k/(k-1)}]$$

where m is the mass flow rate or molar flow rate for the gas, $c_p$ is the specific heat of the gas, and k is the ratio of specific heats for the gas. The first bracketed term is the contribution of the temperature of the gas to the physical exergy of the stream, and the second bracketed term is the contribution of the pressure of the gas to the physical exergy of the stream. In each bracket, the exergy contribution is specific to the state of the environment, which is consistent with the definition of exergy as being the amount of work that could theoretically be extracted from the stream if it were to be reversibly brought into equilibrium with the environment.

Assuming that the inlet and outlet conditions of the stream to be heated are $T_1$, $P_1$ and $T_2$, $P_2$, respectively, and assuming that the inlet and outlet conditions of the heating stream are $T_3$, $P_3$ and $T_4$, $P_4$, respectively, then since there are no changes in kinetic energy, potential energy, or chemical exergy, the expression for the amount of exergy that is given up by the hot stream is:

$$E_3 - E_4 = mc_pT_0\{[(T_3/T_4) - 1 - \ln(T_3/T_4)] - [\ln(P_3/P_4)^{k/(k-1)}]\}$$

where k is the ratio of specific heats. Likewise, the exergy increase of the cold stream is:

$$E_2 - E_1 = mc_pT_0\{[(T_2/T_1) - 1 - \ln(T_2/T_1)] - [\ln(P_2/P_1)^{k/(k-1)}]\}$$

For a reversible process, there would be pressure drop within either stream, and there would be no temperature difference between the streams at any point at which heat is exchanged. That is, we would have $T_1 = T_4$ and $T_2 = T_3$. However, reversible processes exist only in textbooks, and in fact there can be no heat transfer without temperature differences. Therefore, for a realistic recuperative heat exchanger, some exergy is destroyed ($E_{DES}$) and this can quantitatively can be expressed as:

$$E_{DES} = (E_3 - E_4) - (E_2 - E_1)$$

In accordance with the Second Law of Thermodynamics, some exergy is destroyed in the recuperative heat exchanger example, just as some quantity of exergy must be destroyed in any energy transformation. In the example, the loss in exergy is physically accomplished through friction (pressure drop) and heat transfer (against a temperature difference). The latter feature is further demonstrated by the observation that $T_2 < T_3$ for real heat exchangers.

When no chemical reactions or other exergy transfers are accomplished by a component, the exergetic efficiency of a device is typically calculated to be the increase in physical exergy within the product stream divided by the decrease in physical exergy within the other stream. For this case of the recuperative heat exchanger, the exergetic efficiency (or Second Law efficiency) is therefore:

$$\epsilon_{second\ law} = (E_2 - E_1)/(E_3 - E_4)$$

This example further demonstrated another previously mentioned feature: All real-world processes result in some degree of degradation in the useful work that could be accomplished by any energy stream.

There is perhaps no better example than the case of a simple, steam powerplant, producing electricity from a fossil fuel. In this case, the chemical exergy of the fuel is converted to heat in the furnace at a high temperature, perhaps exceeding 2000° C. with this heat being used to produce superheated steam, typically at less than 600° C. If we assume that the environment is at about 25° C., then applying the efficiency derivation of Carnot for heat engines, we would expect that a reversible heat engine could extract useful work at a First Law efficiency of $$\epsilon_{first\ law} = [1 - (25 + 273)/(600 + 273)] \times 100\% = 65.8\%$$

However, conventional steam powerplants typically produce electricity at First Law efficiencies of only about 35-40%. This supports two observations: 1) that the conversion of the fossil fuel's chemical exergy to physical exergy within the combustion gases and then to physical exergy within the superheated steam, at only 600° C., results in the destruction of 34.2% of the chemical exergy of that fuel, and 2) that there is significant additional destruction of exergy in the remainder of the steam powerplant. This fact is of course well known to engineers, who also appreciate that the largest source of exergy destruction in the steam powerplant is in fact the irreversible transfer of heat from the combustion gases to the steam, which is typically only heated to several hundred degrees.

In general, combustion of a fuel is a source of large irreversibilities, and therefore it is typically accompanied by the destruction of a significant quantity of the chemical exergy of the fuel. However, these irreversibilities can be reduced through preheating of and minimizing the use of excess air. In this way, heat transfer across temperature differences, a significant source of exergy destruction, can be minimized.

On the value of the exergetic efficiency metric, Bejan et. al. state that:

> The exergetic efficiency ... is generally more meaningful, objective, and useful than any other efficiency based on the first or second law of thermodynamics, including the thermal efficiency of a power plant, the isentropic efficiency of a compressor or turbine, and the effectiveness of a heat exchanger. The thermal efficiency ... is misleading because it treats both work and heat transfer as having equal thermodynamic value. The isentropic turbine efficiency, which compares the actual process with an isentropic process, does not consider that the working fluid at the outlet of the turbine has a higher temperature (and consequently a higher exergy that may be used in the next component) in the actual process than in the isentropic process. The heat exchanger effectiveness fails, for example, to identify the exergy waste associated with the pressure drops of the heat exchanger working fluids.

In steam powerplants, First Law and Second Law efficiencies are often about the same, in part because the chemical exergy of a fuel is about equal to the Heat of Combustion for the fuel. However, for many components and systems, the First Law and Second Law efficiencies are often very different, as can be observed in Table 1 (from Kenney, Energy Conservation in the Process Industries, Academic Press 1984).

TABLE 1

Comparison of First and Second Law Process Efficiencies (%)

| Unit Operation (or process) | First Law | Second Law |
|---|---|---|
| Residential heat (fuel) | 60 | 9 |
| Domestic water heater (fuel) | 40 | 2-3 |
| High-pressure steam boiler | 90 | 50 |
| Tobacco dryer (fuel) | 40 | 4 |
| Coal gasification, high Btu | 55 | 46 |
| Petroleum refining | ~90 | 10 |
| Steam-heated reboiler | ~100 | 40 |
| Blast furnace | 76 | 46 |

Table 1 also reflects the fact that a First Law efficiency calculation is 100% if there is no loss of energy to the environment. The Second Law efficiency calculation, however, includes the realization that irreversibilities in the process reduce the ability of the energy flow to effect change (support work or chemical conversions/separations).

Although exergy is thermodynamically equivalent to the maximum available potential work that could be obtained, there is significant value to using this metric as a measure of value and efficiency for the process industries. For one thing, process plants are often extremely energy intensive, containing significant heat exchanger networks, and a system that produces a high value chemical product (whether it be a fuel or not) is often more valuable if it does so with reduced energy requirements compared to an alternate system that requires the consumption of larger quantities of energy. Increased energy efficiency likewise corresponds to a reduction in the amount of fuel (or, commonly, feedstock petrochemicals) required in a process plant, with similar reductions in atmospheric emissions, including greenhouse gases.

The inventors have therefore attempted to design a compact microchannel device to include exergetically efficient recuperative heat exchangers (to preheat reactants), and exergetically efficient reactors and combustors. For the realization of a improved energy efficiency, the invention utilizes recuperative microchannel heat exchangers that operate with high exergetic efficiency, which includes consideration of thermodynamic irreversibilities associated with both heat transfer and pressure drop. Here, the chemical exergy of the flowstream is unimportant, as there is no transfer of chemical exergy content (due to there being no chemical conversion taking place). Hence, the destruction of exergy in a well insulated, recuperative microchannel heat exchanger comes primarily through a) heat transfer against a temperature difference (resulting in a degradation of the quality of heat available in the stream, or alternately, a reduction in the amount of work that could be performed if the stream provided energy for a heat engine) and b) pressure drop due to fluid friction (resulting in a reduction in the possible work that could be performed by the stream).

Conventionally, heat exchangers in microsystems have been designed to achieve First Law efficiency. In the present invention, by analyzing factors important for high exergetic efficiency such as short heat transport distances, large temperature differences and low pressure drops, we have designed a microsystem having an exergetically efficient heat exchanger. Preferably, the heat exchanger is at least 80%, more preferably at least 85%, exergetically efficient. In some embodiments, the heat exchanger is between about 80 and about 95% exergetically efficient. In the present invention, exergetic efficiency is measured by the example below. Examples of some structures, conditions and modifications that can be applied in exergetically efficient microsystems are discussed in the following sections.

Figure 4:
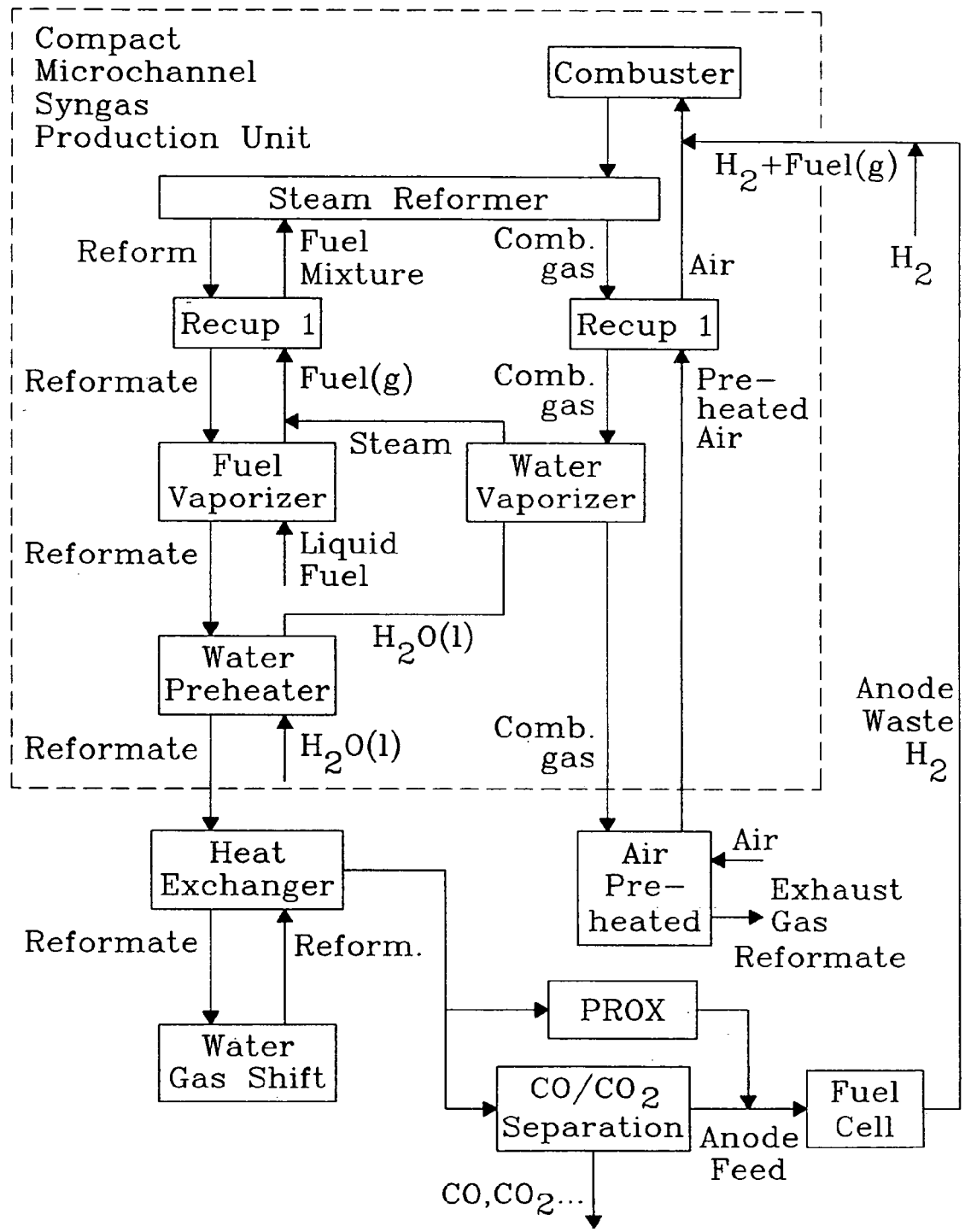
FIG. 4 is a flow diagram for a compact steam reforming unit with fuel cell.
Figure 5:
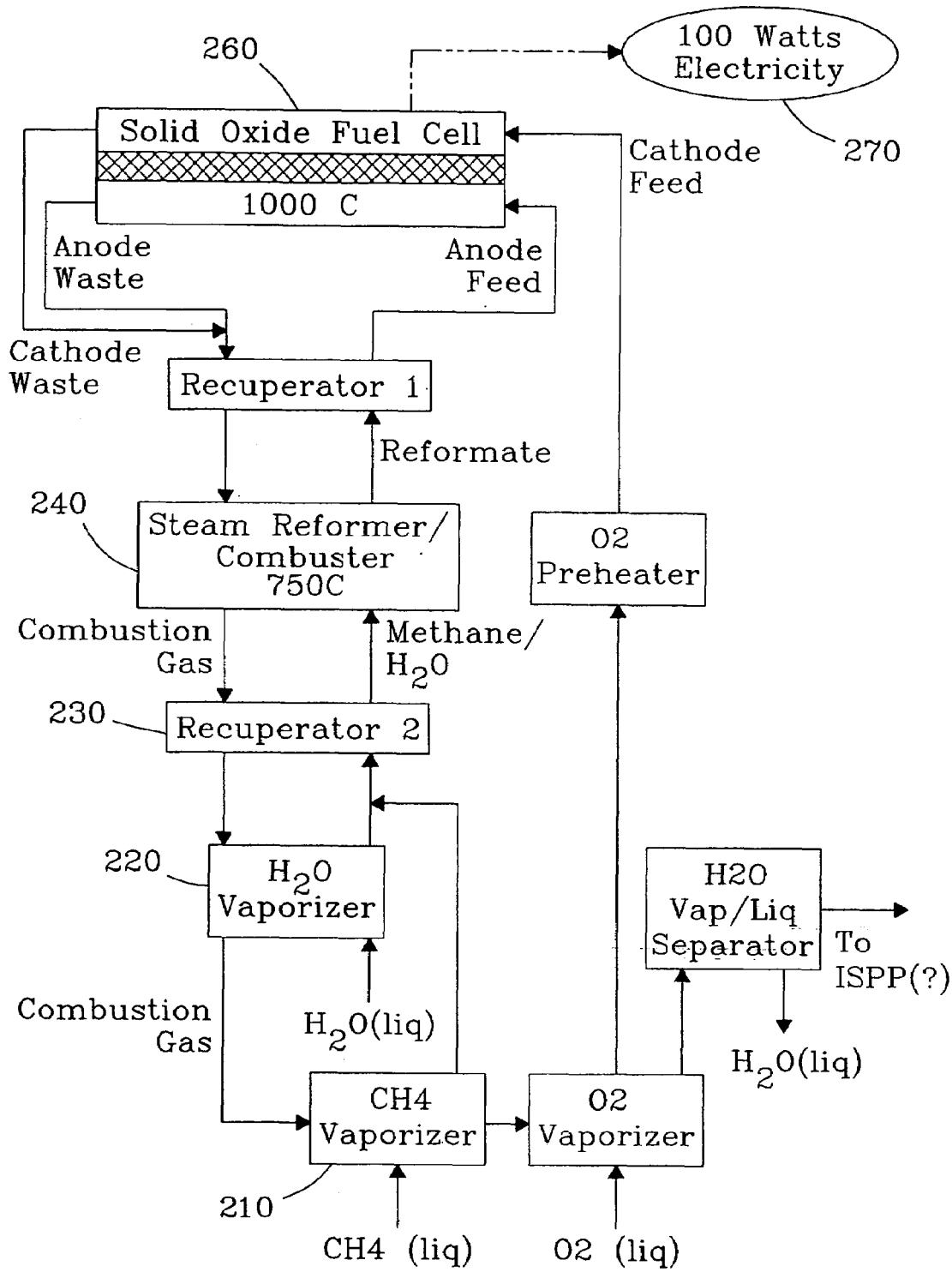
FIG. 5 is a flow diagram for a compact steam reforming unit with solid oxide fuel cell.

System Constriction a) System overviews. Flow charts of two systems utilizing steam reforming are illustrated in FIGS. 4 and 5. In FIG. 4, water is preheated in preheater 10 prior to being vaporized in water vaporizer 20. Liquid fuel, such as iso-octane, is vaporized in fuel vaporizer 30. Recuperator 40 heats the fuel and steam. The fuel-steam mixture flows into steam reformer 50. Since steam reforming is a highly endothermic reaction, hot gases from combustor 60 are passed through the steam reformer to heat the reactants in reformer 50. After transferring heat in the steam reformer, residual heat in the combustants is captured by passing the combustants through recuperator 70 where air is heated, and water vaporizer 20. Product gas 55 from the steam reformer passes through recuperator 40 where heat is transferred to the fuel mixture. Additional heat is transferred in fuel vaporizer 30 and water preheater 10. The foregoing components comprise a complete microchannel syngas production unit. If the system is used with PEM fuel cells, for power generation, then the synthesis gas (also called syngas) product will require additional processing prior to introduction to the internals of the PEM fuel cell 82, as CO is a catalyst poison for most PEM fuel cells, and as the overall system efficiency can be increased if the CO is converted to $CO_2$ within a water-gas-shift reactor, which also transfers the energy content of the CO into additional $H_2$ content, which is the fuel for a PEM fuel cell. Application with PEM fuel cells is depicted within FIG. 4.

The objective of the compact microchannel steam reforming unit, schematically illustrated in the left side of FIG. 4, is the production of hydrogen-rich gas from hydrocarbon feedstock, for applications where there are advantages through the realization of compact, lightweight hardware for hydrogen gas production. Examples include power production for both stationary and mobile applications (e.g., vehicular applications), where the product gas is subsequently processed as necessary in accordance with the fuel requirements of a fuel cell and for the production of chemicals where hydrogen or synthesis gas is a feedstock to the chemical process that is employed. This flowsheet indicates steam reforming of liquid hydrocarbons, however, other embodiments could utilize gaseous hydrocarbons (e.g., methane).

A compact microchannel steam reforming unit can include:

- Microchannel catalytic steam reforming reactors (1 or more)—which contain integral microchannel heat exchangers so that the endothermic steam reforming reaction receives its heat from the combustion gas stream
- Microchannel recuperative heat exchangers (2 or more)— which provide for efficient preheating of the stream reforming stream and the combustion stream, utilizing (respectively) the stream reforming products and the combustion products as the source of heat from each.
- Microchannel vaporizers for generating steam and gaseous hydrocarbons. In the system configuration that is depicted in FIG. 4, the heat of vaporization for both streams is essentially provided by the latent heat of the combustion (product) stream, however other system configurations are possible where some of the heat of vaporization of one or both streams are provided, in part, from the latent heat that is present in the steam reforming (product) stream, or where the heat of vaporization for either or both the water and the hydrocarbon stream are separately provided.
- Microchannel or other compact units for the provision of heat to the heat-providing stream (e.g., a compact combustion unit).

A highly efficient recuperative microchannel heat exchanger in this system is identified as Recuperator 1, which has been designed to function with an exergetic efficiency exceeding 85%. The exergy analysis of this component and the other components of the system is presented in the following section.

If the unit is used with solid oxide fuel cells (SOFCs), then no additional processing of the syngas product is required. In this case, a further advantage is realized, wherein the heat from the high temperature SOFC is at a high enough temperature so that it can be used as process heat for the endothermic steam reforming reactor. FIG. 5 shows one possible system configuration of the Compact Microchannel Steam Reforming Unit when used with a solid oxide fuel cell. In this system, fuel is vaporized in vaporizer 210, combined with steam from A water vaporizer 220 and heated in recuperator 230. The heated stream is reacted in reformer 240. The reformer 240 is integrated with a combustor that supplies additional heat. The resulting reformate is heated to 900° C. to 1100° C., preferably about 1000° C., in recuperator 250 and passed to solid oxide fuel cell 260 to generate electrical power 270. Waste heat from the solid oxide fuel cell can be recovered by passing the hot waste gases back through the system as shown in FIG. 5.

In general, the design capacity of the compact microchannel synthesis gas production unit could be increased by either increasing the size and throughput of each component, proportionally, or by utilizing a design for the system where multiple process trains are processed in parallel, or by some combination of both. For the case where multiple process trains are processed in parallel, there are additionally other features that can support the energy efficient production of synthesis gas, such as by operating each train (and component) at a point that is near or at its most efficient conditions, and digitally turning up (or down) the production rate by turning on (or off) individual process trains.

It is also apparent that individual components can be separately plumbed into the system without exceeding the contemplated bounds of the invention, so that not all components have to be part of the same integral hardware unit.

Hydrocarbon feedstocks for which this unit is considered include intermediate-length-chain hydrocarbons (e.g., isooctane) and short-chain hydrocarbons (e.g., methane, ethane, etc), plus alcohols (e.g., methanol, ethanol, etc). The production of syngas from complex mixtures (e.g., gasoline or diesel fuel) is contemplated; however, additional unit operations may be required in order to deal with constituents that are problematic for reforming. Example constituents of concern include sulfur-containing compounds, aromatics, and detergents.

For the heat-providing stream, energy can be provided through either a) the combustion of a portion of the hydrocarbon feedstock, a portion of the steam reformer gas product, a fuel-containing stream that comes from downstream processing (e.g., the anode effluent of a fuel cell), or some other fuel stream or b) process heat from some other system (such as a high temperature, solid-oxide fuel cell), or c) some combination of a) and b) together.

Many other embodiments are contemplated within the scope of this invention. For example, highly efficient recuperative microchannel heat exchangers could be utilized as part of a $CO_2$ collection system (which is based on temperature swing absorption) and for preheating of reactants to and cooling of products from the reactors.

b) Shim designs and exergetic efficiency calculations. The following section describes, with accompanying figures, shim designs that were fabricated and tested. The section also includes some generalized discussion of component design, modifications, and operating parameters that are applicable in a wide variety of devices and systems. Although components are described as part of a steam reforming apparatus, it should be understood that the following designs and other descriptions are not limited to the steam reforming process, but are generally applicable to systems employing microchannel components.

EXAMPLE

Highly Exergetic Recuperative Heat Exchanger

A microchannel recuperative heat exchanger was designed, fabricated and experimentally demonstrated to be highly efficient, with an exergetic efficiency (considering both heat transfer against a temperature difference and pressure drop) that was demonstrated to be greater than 80%. The microchannel heat exchanger was designed to achieve a desired heat transfer effectiveness of 0.85. The design is described below. Several conservative assumptions were made in the initial design model including:

- calculating the Nusselt number for both constant temperature and constant heat flux boundary conditions and taking the minimum (constant heat flux is the more correct boundary for the recuperator)
- giving full weight to longitudinal conduction in the metal at the outside edges of the exchanger
- using an abbreviated pressure drop calculation with an extended entrance section to estimate shim pressure drop rather than a short entrance followed by an expanding region.

Figure 6:
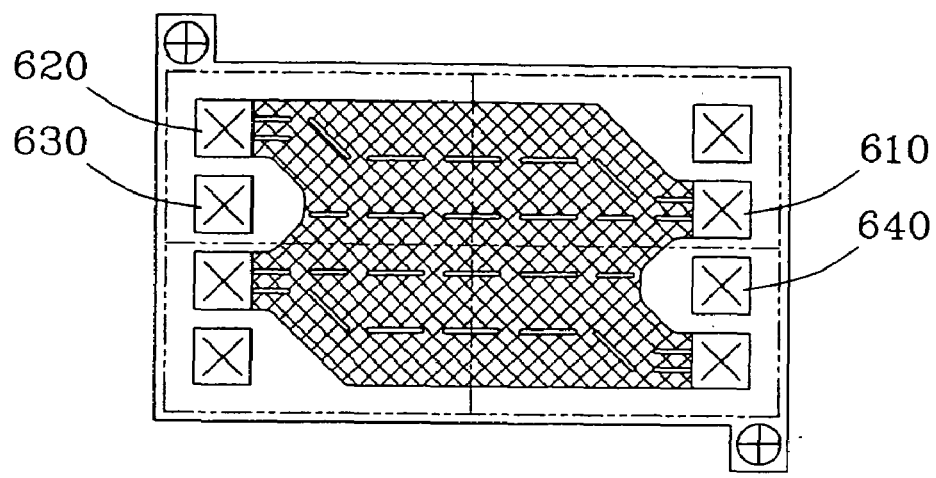
FIG. 6 is a top down view of a shim for a microchannel heat exchanger.

A microchannel recuperative heat exchanger was constructed that consisted of 10 pairs of shims consisting of 20 mil (0.50 mm) shims partially etched to a depth of 10 mil (0.25 mm). The entire device was constructed of 316 stainless steel. The shim design for shim "A" is shown in FIG. 6. The "B" shim is the mirror image of the "A" shim except that it connects to the alternate set of header holes. The device was covered top and bottom by 50-mil (1.25 mm) thick cover plates. The shims was assembled with the A and B plates facing each other: Top Plate, A, B, A, B . . . A, B, Bottom Plate. The top plate has 2 header holes that align with the header holes 610, 620 in Plate A and the bottom plate has 2 header holes that connect to the header holes in Plate B. The two gases flow countercurrent in the heat exchange section and in the headers flowing in the stack direction flow in the same direction (e.g. the initially hot gas enters through headers 610 and leaves through headers 620 while the initially cold gas enters through headers 630 and leaves through headers 640). The header holes were etched from both sides with all other areas on the back side masked off. Prior to bonding, a nickel coating was applied over the steel plates and the unit was diffusion bonded. The tolerance on the alignment pin holes could not be achieved in the etching process so the holes were made slightly undersized and manually reamed to the correct size. External headers consisting of one half of a ⅜" tube (0.0325 inch wall) with a ⅜" tube "tee" leg were welded onto the two stacks. The external headers combine the two internal header holes and provided for a connection to the test stand. A full tubing tee leg was centered on the shim width.

The design included a 100 mil (0.25 cm) bonding perimeter in all regions that require a seal. In the shim entrance regions, which are supporting bonding in the shim directly above, two 20-mil wide ribs were placed in the 250 mil opening dividing it into three 70 mil passages. This approach successfully sealed the device.

The internal support ribs in the heat exchange section were spaced at approximately quarter-inch intervals. Leak-proof bonding is not required in the region of the internal ribs so the major function of the ribs is to limit the deflection of the wall due to differential pressures. The four slanted ribs are intended to help distribute flow. In the section with flow directed along straight ribs, the support ribs are intermittent. This allows flow redistribution if needed. It is believed that if flow is not sufficiently uniform, heat transfer effectiveness may suffer significantly. The interrupted support rib is expected to have a small positive effect on heat transfer and introduce a small penalty in flow friction.

The shim stock from slice of stainless indicates that the 0.020 inch thickness material has a tolerance of ±0.003 inch. A single sampling of one shim A and one shim B (6 measurement points on each) indicated that the shim material was about 20.6 mil on the shim A sample and 20.9 mil on the shim B sample, which is well within the 3 mil tolerance. The depth of the etching on these two shim samples averaged 10.0 mil on shim A and 9.8 mil on shim B. No measurements were made of a standard thickness gauge for comparison and the calibration of the micrometer was expired so this data should be considered as indication only. The overall thickness of the recuperator after testing was 0.4973 inch compared to a target thickness of 0.5000 inches (2*0.050"+20*0.020").

The size of the bonded unit was measured to be 3.020 inches by 1.50 inches by 0.50 inches (2.265 $in^3$, or 37.12 $cm^3$). Pressure taps and thermocouples were located at the tees into which each exchanger inlets/outlets are connected. Kao-wool insulation was applied to the exchanger and wrapped in aluminum tape.

Heat exchanger tests were conducted by selecting the desired nitrogen flow and furnace temperature and then waiting for temperatures on the exchanger to stabilize. All data was taken at steady state. The time required to achieve a steady state condition was between 15 and 45 minutes depending on temperature and flow rate. The slow dynamics are believed to be primarily due to the long flowpath and thermal mass associated with the heated gas flow path prior to entering the exchanger. This could be modified to allow more rapid collection of data. No attempt was made to sort out the dynamic response of the recuperator itself from the data. A total of 21 steady-state test conditions were recorded and evaluated with full insulation on the exchanger, with heating rates being varied from 86 watts to 943 watts. The highest thermal power density (heat rate per unit hardware volume) was therefore 25.4 watts/$cm^3$. The system was operated with nitrogen as the working fluid at flow rates varying from 30 to 126 slpm at inlet pressures for the cold fluid ranging from 4.76 to 30.95 psig. The same stream was used for both the cold fluid and the hot fluid, with the cold fluid being additionally heated after leaving the heat exchanger before being returned to the unit and serving as the hot fluid. Inlet temperatures for the cold fluid were generally about 23-26° C. Outlet temperatures for the cold fluid were raised to various levels, ranging from 188° C. to 473° C. The inlet temperature for the hot fluid was varied from 220-575° C. with the outlet temperature varying from 61-145° C.

Upon first examination of the data it was clear that the model was slightly conservative in predicting effectiveness (i.e. the actual exchanger effectiveness was higher than the model prediction). The first adjustment made to the model prior to reducing the data was to force the model to use the constant heat flux boundary condition in estimating the Nusselt number rather than the constant temperature boundary condition. The constant heat flux boundary is clearly the more correct boundary for the recuperator and the minimum Nusselt number was used simply as a conservatism in design.

Figure 7:
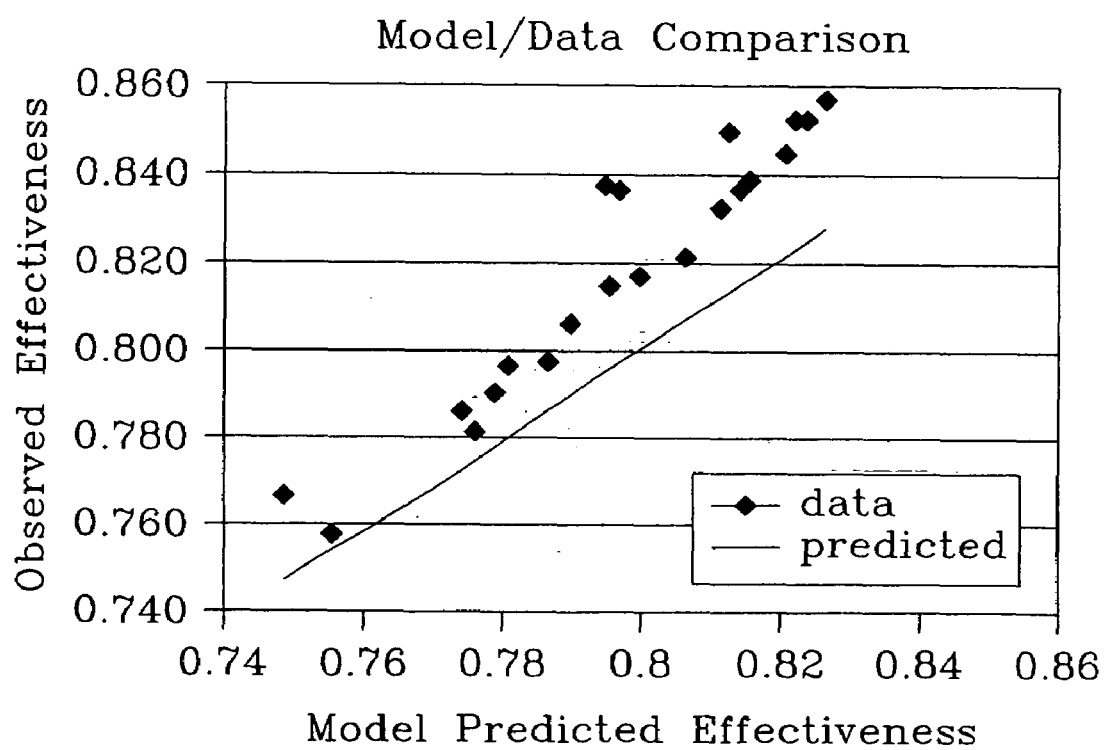
FIG. 7 is a graph of observed versus predicted effectiveness for the heat exchanger.

The model predictions of effectiveness (using the constant heat flux boundary condition) are plotted against the observed effectiveness in FIG. 7. The area for heat transfer in the model is taken as $2.80 \times 10^{-2}$ $m^2$, consisting of a region $4.755 \times 10^{-2}$ m long and $3.099 \times 10^{-2}$ m wide. This assumed area neglects the area in the entrance regions to the headers.

Figure 8:
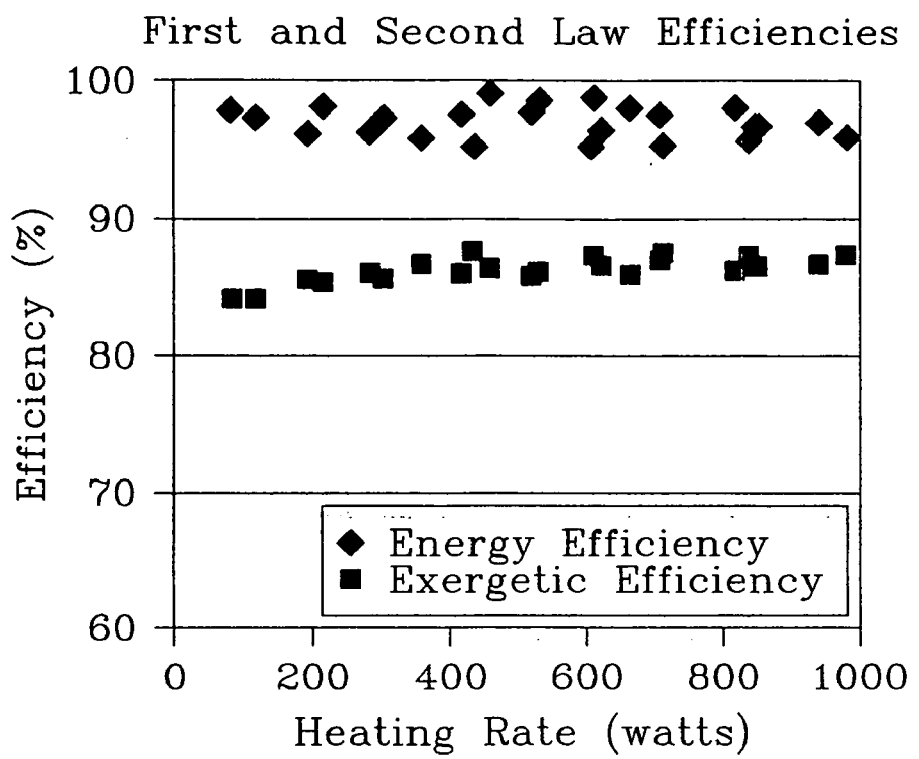
FIG. 8 is a graph of energy and exergy efficiency as a function of heating rate for a microchannel heat exchanger.
Figure 9:
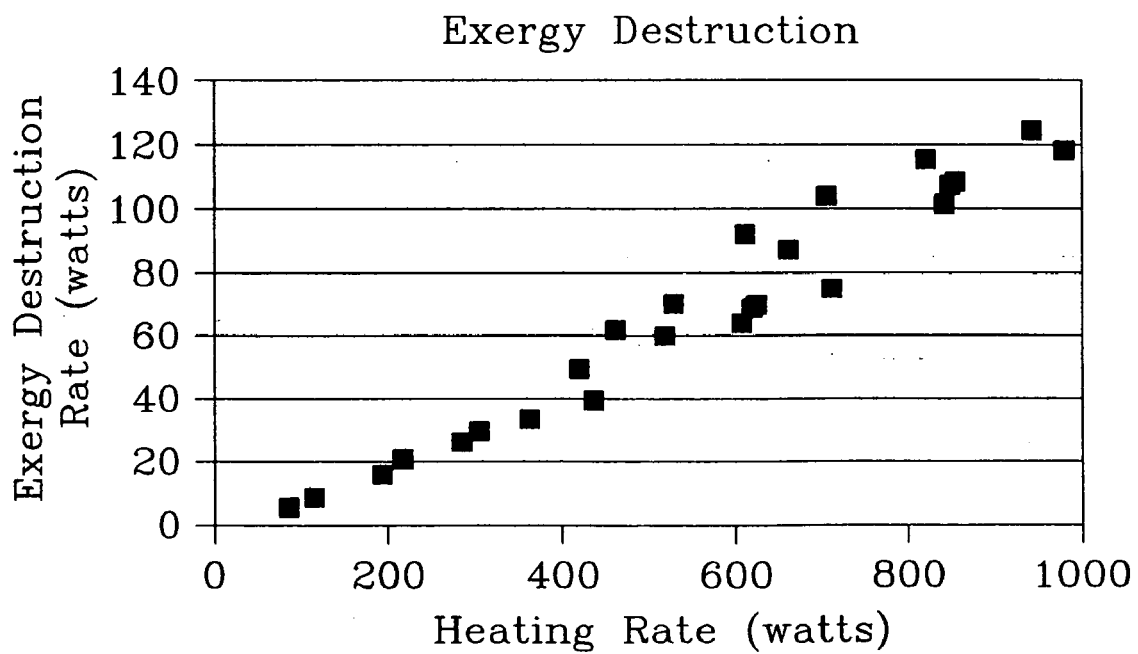
FIG. 9 is a graph of exergy destruction as a function of heating rate for a microchannel heat exchanger.
Figure 10:
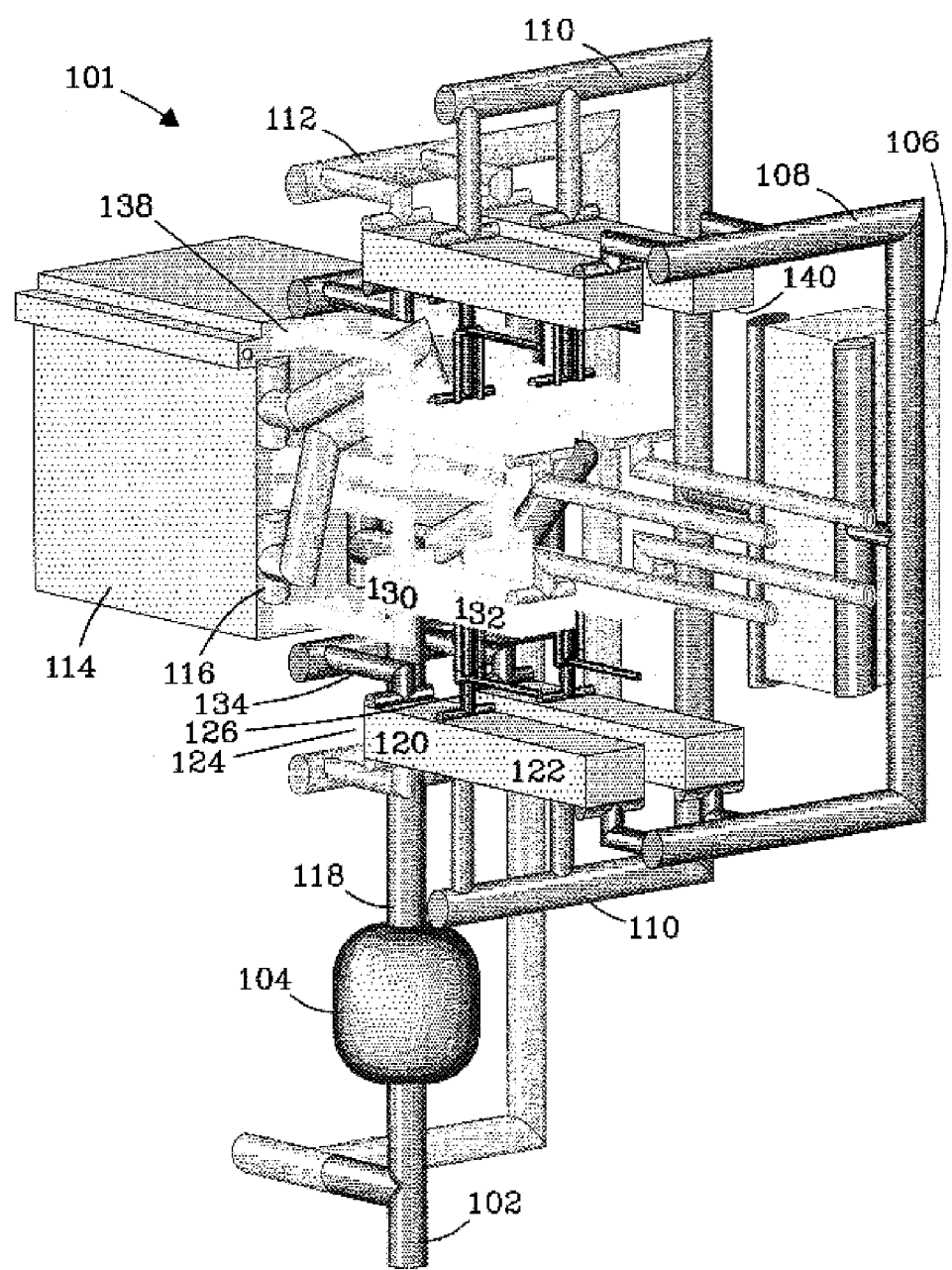
FIG. 10 is a color drawing of a compact steam reforming unit.
Figure 18:
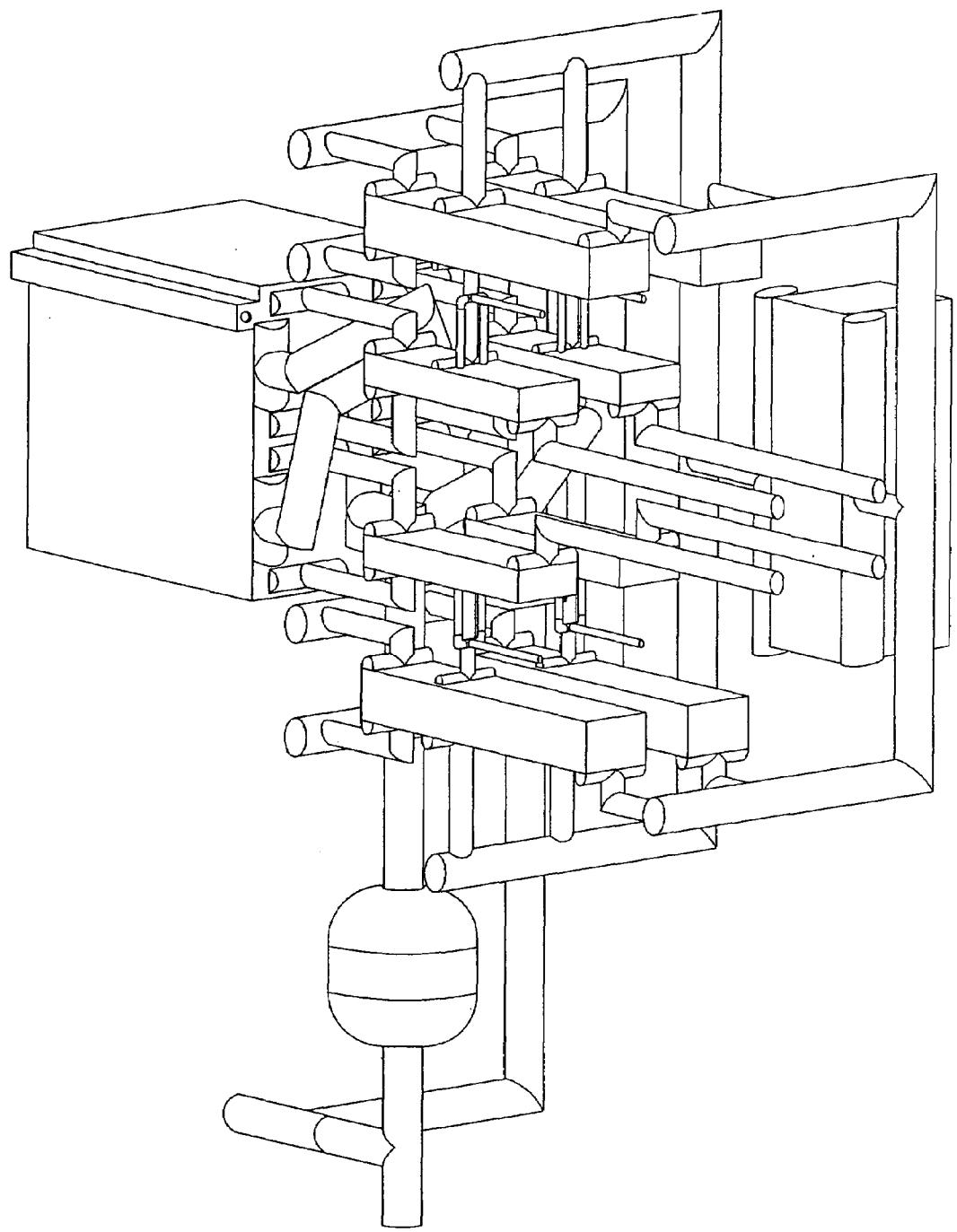
FIG. 18 is a black and white rendition of the compact steam reforming unit shown in FIG. 10.

The exergetic efficiency of the microchannel heat exchanger was calculated from the data by using the technique for ideal gases (Bejan, Tsatsaronis, and Moran, 1996), taking into account both temperature data and pressure data, and are shown in FIG. 8. FIG. 9 additionally shows the amount of exergy destruction as a function of heating rate A preferred embodiment of a steam reformer system is illustrated in FIGS. 10-15. This system is called "the Compact Microchannnel Steam Reforming Unit" in the following discussion. A schematic overall view of the apparatus 101 is illustrated in color in FIG. 10 (a black and white rendition is included as FIG. 18). Fresh air enters through air preheater inlet 106 and is warmed in the air preheater (gray block). The air is split into four streams moving through conduits 110 (green) to four recuperators 124, 140 (pink). Each of these recuperators contains a recuperative heat exchanger 120 and water vaporizer 122. Hot air exits recuperator 120 into header 112 (gray) and is mixed with fuel in tube 102 (red) which travels to combustor 104 (red). The resulting combustants travel through header 118 to reactor 114 (blue). The gas runs in series through four cells. In each cell, heat from the combustants is transferred to drive the endothermic production of hydrogen. At the reactor, the combustant stream is connected in series while the reactant stream is connected in parallel. After passing through the first cell, the gas leaves the reactor 114 through header 116 (purple) and hydrogen gas is injected through an inlet (not shown) in the header 116. The hydrogen gas spontaneously ignites, adding heat to return the gas to the temperature at which the gas first entered the reactor. The gas then reenters the reactor to again drive the formation of hydrogen. After passing through the fourth cell, the combustant gases exits through a header 134 (pink) where it is split into four separate streams and used to vaporize water. The combustant streams are recombined in header 108 and used to warm up air in the air preheater before being exhausted.

In the other fluid stream, water (which optionally could come through a preheater) comes into each of four water vaporizers 122, is converted to steam, and passes through headers 126 (blue) to fuel vaporizer 132 (yellow) where the steam is mixed with fuel from a fuel inlet (not shown) and each of the four mixtures passes through a header 138 (yellow) into a cell of reactor 114 where hydrogen is produced. In a preferred embodiment, both the reformate stream and the combustant (heat exchange) fluid streams exit the reactor at about 750° C. Heat from the reformate stream is recovered in recuperator 130 and vaporizer 132 and the reformate exits the device (through gray tubes).

Figure 12A:
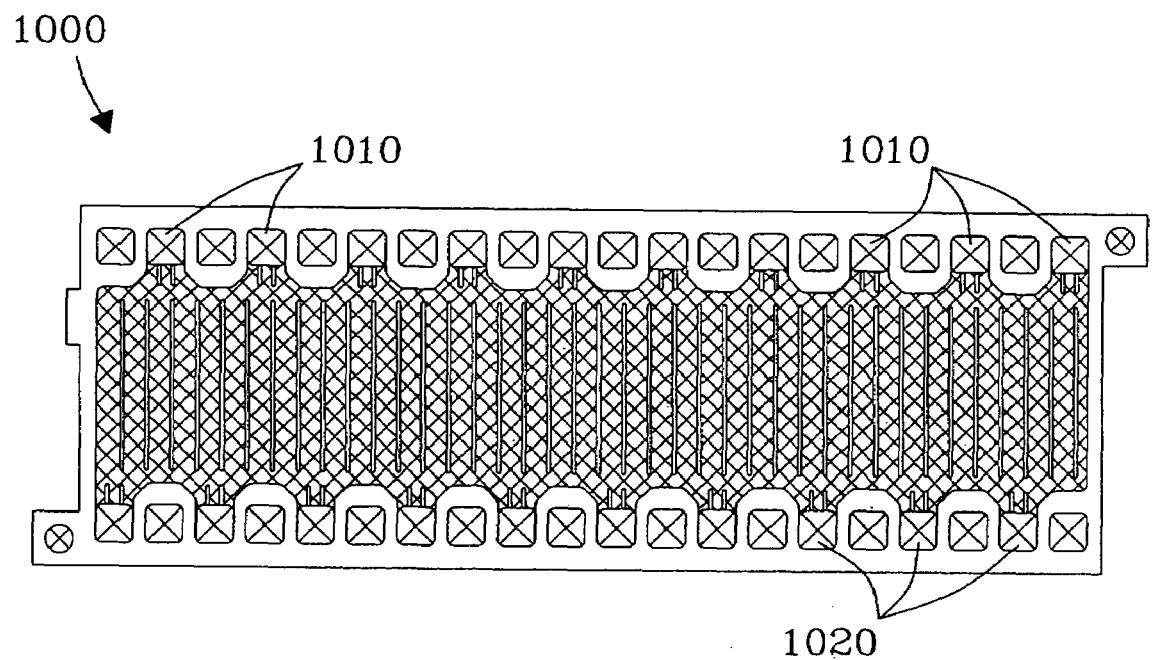
FIG. 12a is a top down view of a shim of a microchannel heat exchanger.
Figure 12B:
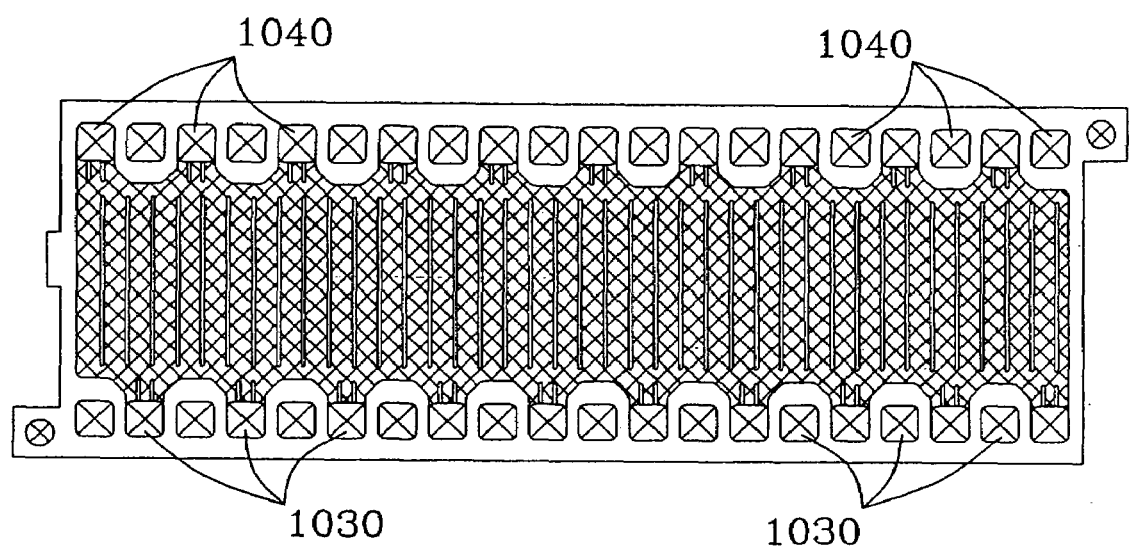
FIG. 12b is a top down view of a shim of a microchannel heat exchanger.

The design for the air preheater was an interleaved microchannel heat exchanger 1000 that consisted of 10 pairs of shims consisting of 20 mil (0.50 mm) shims partially etched to a depth of 10 mil (0.25 mm). The entire device was constructed of 316 L stainless steel. The shim design for shim "A" is shown in FIG. 12*a*. The "B" shim, shown in FIG. 12*b*, is the same as the "A" shim except that it connects to the alternate set of header holes. The device is covered top and bottom by 50-mil (1.25 mm) thick cover plates. The shims are assembled: Top Plate, A, B, A, B . . . A, B, Bottom Plate. The top plate has 20 header holes that align with the header holes 1010, 1020 in Plate A and the bottom plate has 20 header holes that connect to the header holes in Plate B. The two gases flow countercurrent in the heat exchange section and in the headers (e.g. the initially hot gas enters through headers 1010 and leaves through headers 1020 while the initially cold gas enters through headers 1030 and leaves through headers 1040). The shims were 7.1 inch long and 3.0 inch wide. The heat exchanger was bonded as described above.

Figure 13A:
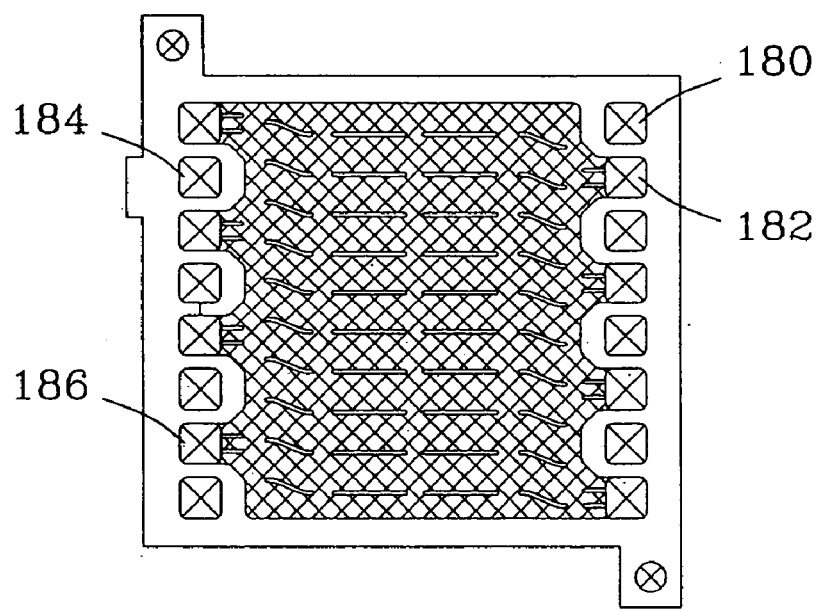
FIG. 13a is a top down view of a shim of a microchannel heat exchanger.
Figure 13B:
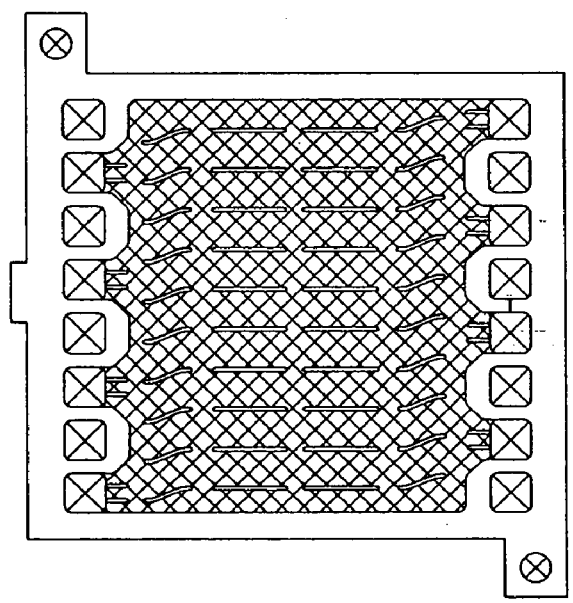
FIG. 13b is a top down view of a shim of a microchannel heat exchanger.
Figure 14A:
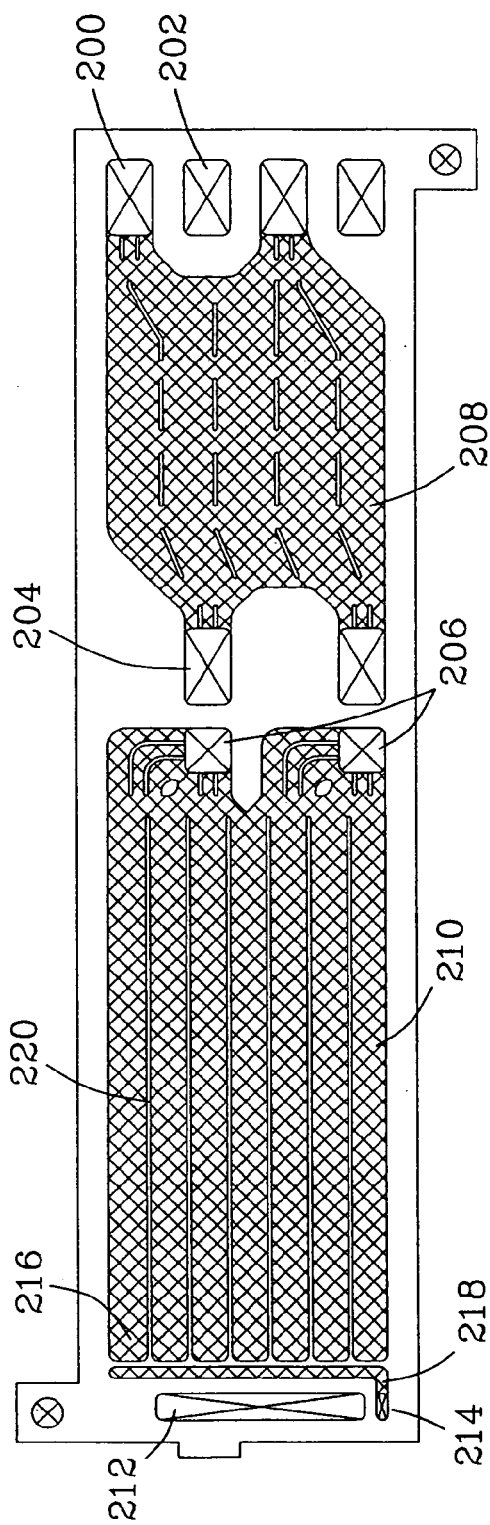
FIG. 14a is a top down view of a vaporizer shim in a microchannel recuperator.
Figure 14B:
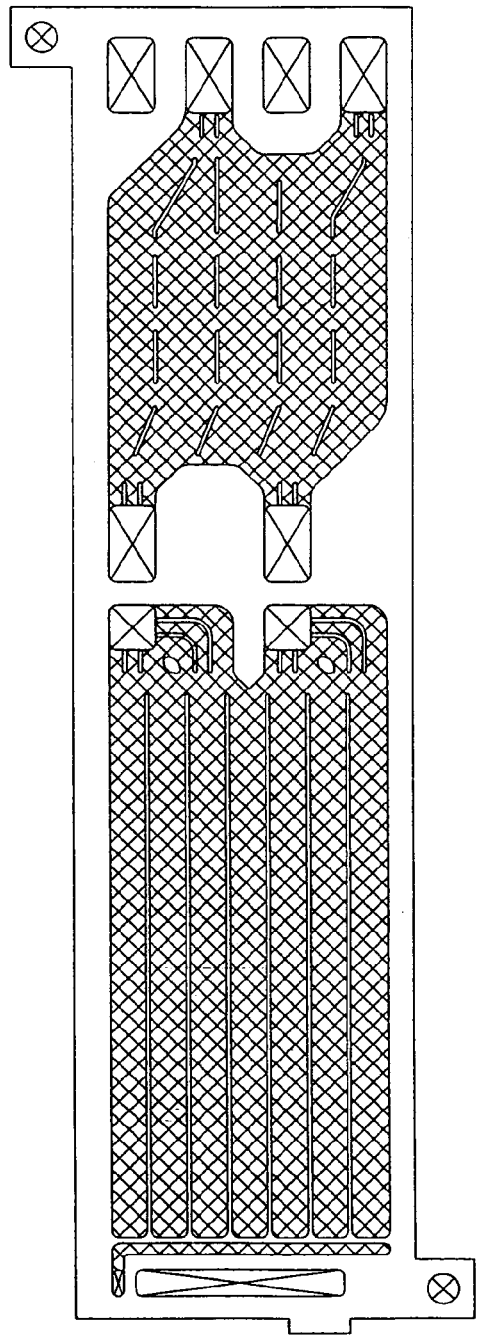
FIG. 14b is a bottom up view of a vaporizer shim in a microchannel recuperator.

A similar design for another interleaved heat exchanger is illustrated in FIGS. 13*a* and 13*b*. In this exchanger, there were 20 pairs of shims consisting of 31 mil (0.78 mm) shims partially etched to a depth of 10 mil (0.25 mm), that is, a channel depth of 10 mil. These shims measured 2.9 inch wide by 3.3 inch long (excluding alignment tabs). This heat exchanger is not illustrated in FIG. 10, but could, for example, be attached to the reformate carrying tubes to condense water.

Figure 11A:
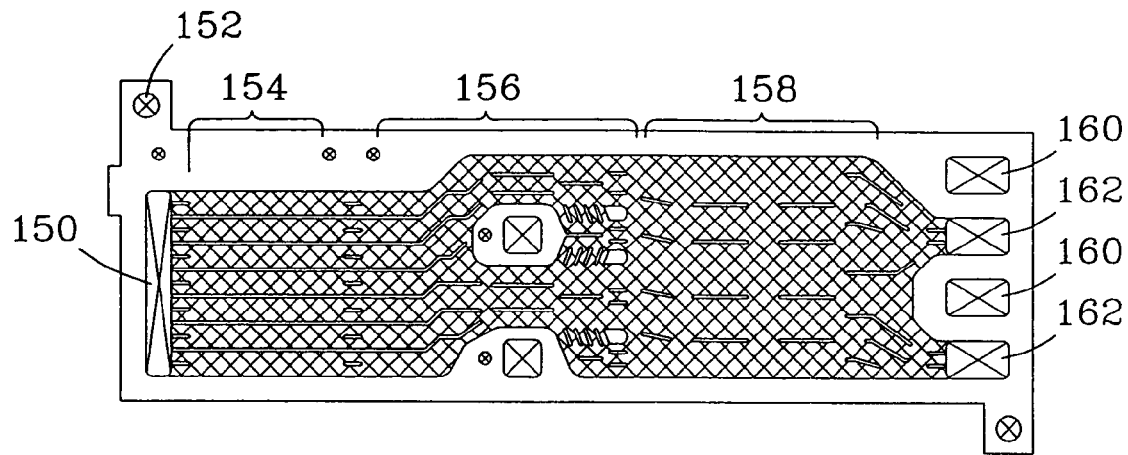
FIG. 11a is a top down view of a heat exchanger shim in a microchannel recuperator.
Figure 11B:
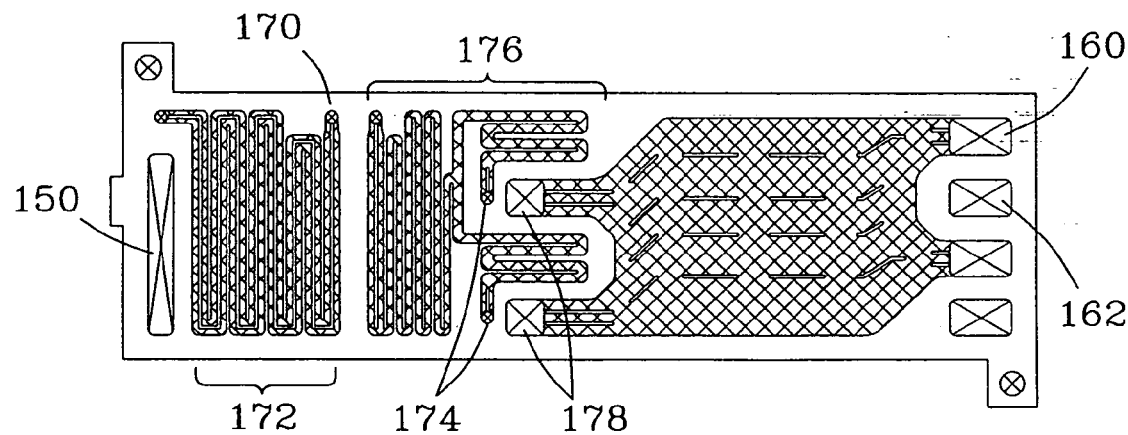
FIG. 11b is a top down view of a shim in a microchannel recuperator.

The shim design for a combined recuperative heat exchanger 130 and fuel vaporizer 132 is illustrated in FIGS. 11*a* and 11*b*. These shims were 17 mil thick with an etch depth of 6 or 7 mil. Each shim is 1.5 inch wide (excluding assembly alignment holes 152, which are cut off after bonding) and 5.34 inches long. The shims shown in FIGS. 11*a* and 11*b* were stacked in alternating layers capped by end plates having inlet and outlet fluid headers. The flow microchannels were structurally supported by 10 mil thick lands. In the heat exchanger layer, hot reformate gas enters through inlets 162, and travels through the layer to outlet 150. While fluid flow flows within a single microchannel, that fluid participates in three unit operations. In the illustrated embodiment, in region 158 heat is transferred to reactants prior to entering the reactor, in region 156 heat is transferred to fuel vaporizer 176, and in region 154, 172 heat is transferred to water. The heated water exits through outlet 170. Vaporized fuel exits through outlets 174. Reactants enter through inlets 178 and exits through outlets 160. Preferably there are at least two layers with a fuel vaporizer and at least one heat exchanger layer, more preferably there are at least three layers with a fuel vaporizer and at least two heat exchanger layers. Each of the layers preferably has a thickness of between 0.1 and 1 mm. While the description refers to a steam reforming process, it should be recognized that the inventive concepts apply to a wide variety of reactions and unit process operations.

Shims for a combination water vaporizer 120/heat exchanger 122 are shown in FIGS. 14*a*-14*d*. In this microchannel device 124, the etched face of the shim illustrated in FIG. 14*a* was placed adjacent to its mirror image (the etched face of the shim illustrated in FIG. 14*b*) to form a shim pair A. The mirror image shims shown in FIGS. 14*c* and 14*d* were similarly matched to form shim pair B. Shim pairs A and B were alternatively stacked (A-B-A-B- . . . ) with 10 A pairs and 11 B pairs. In the air heat exchanger portion of this device, cool air from the air preheater enters through inlets 204, move through microchannels 208, where the air is heated, and hot air exits outlet channels 200 after which the heated air flows to the combustor. Water enters header 218 through inlet 214. The water passes through laser machined orifices 216 and into microchannels 210, where the water is converted to steam and exits through steam outlets 206. Several features are worth noting in this construction. Lands 220 can be provided for structural support; however, it is preferred that the lands have gaps that help equalize pressure in the microchannels, especially in regions where microchannels are curved. The orifices help provide even flow through all the microchannels and reduce the incidence of water spurting through the microchannels. In a preferred embodiment, flow microchannels for a water vaporizer have a height of about 100 to about 2500 micrometers; a width of about 1.3 to about 13 millimeters; and a length of about 1 to about 30 centimeters. A heat exchange fluid, such as a combustant stream, flows through the shims shown in FIGS. 14*c* and *d*. The hot combustants enter through inlets 202, passes through microchannels 226 and 224 to combustion exhaust 212. In region 222, heat is transferred to air, while in region 220, heat is transferred to a water vaporizer—thus illustrating an example in which a heat exchange fluid can be used for multiple, separate unit operations without leaving the same flow microchannel. While two specific unit operations are illustrated, it should be recognized that this technique can be used efficiently for any desired combination of unit operations. The top and bottom plates (not shown) were 0.048 inch thick steel plates having header holes for water inlet, steam outlet, heat exchange fluid inlets and outlets, and air inlets and outlets.

Figure 15A:
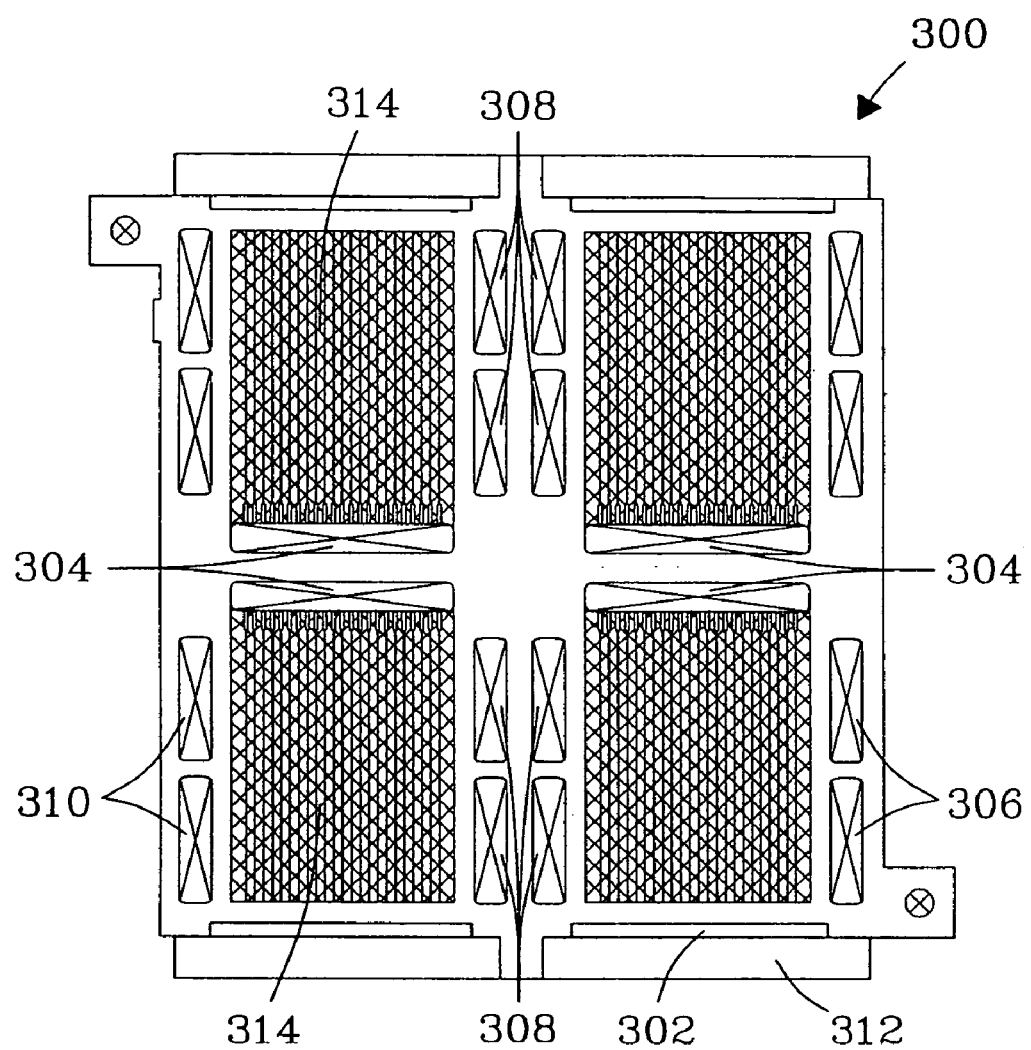
FIG. 15a is a top down view of a reaction chamber layer shim in a reactor.
Figure 15B:
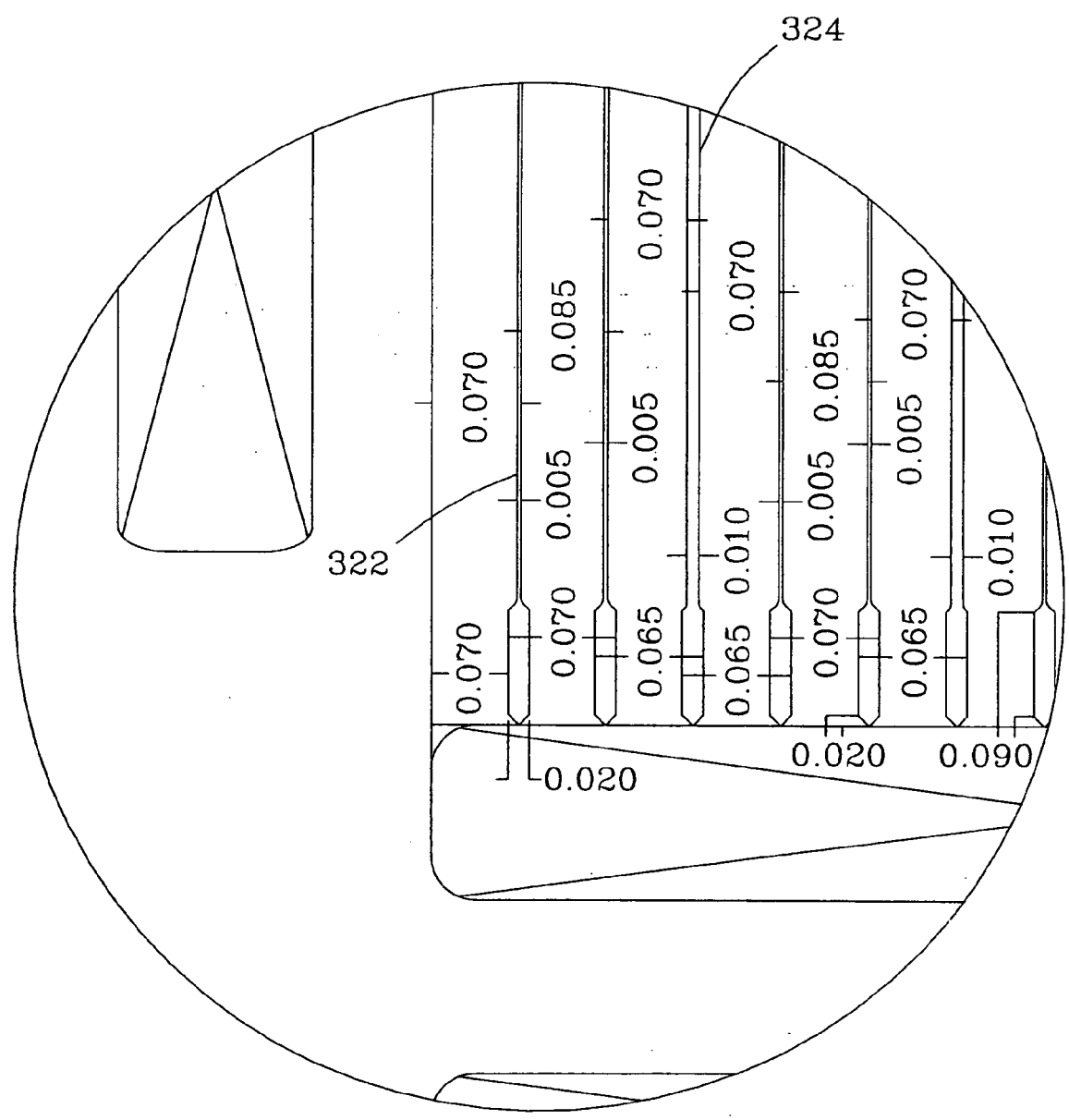
FIG. 15b is a blow up of a reaction chamber showing dimensions in mils.
Figures 15C, 15D:
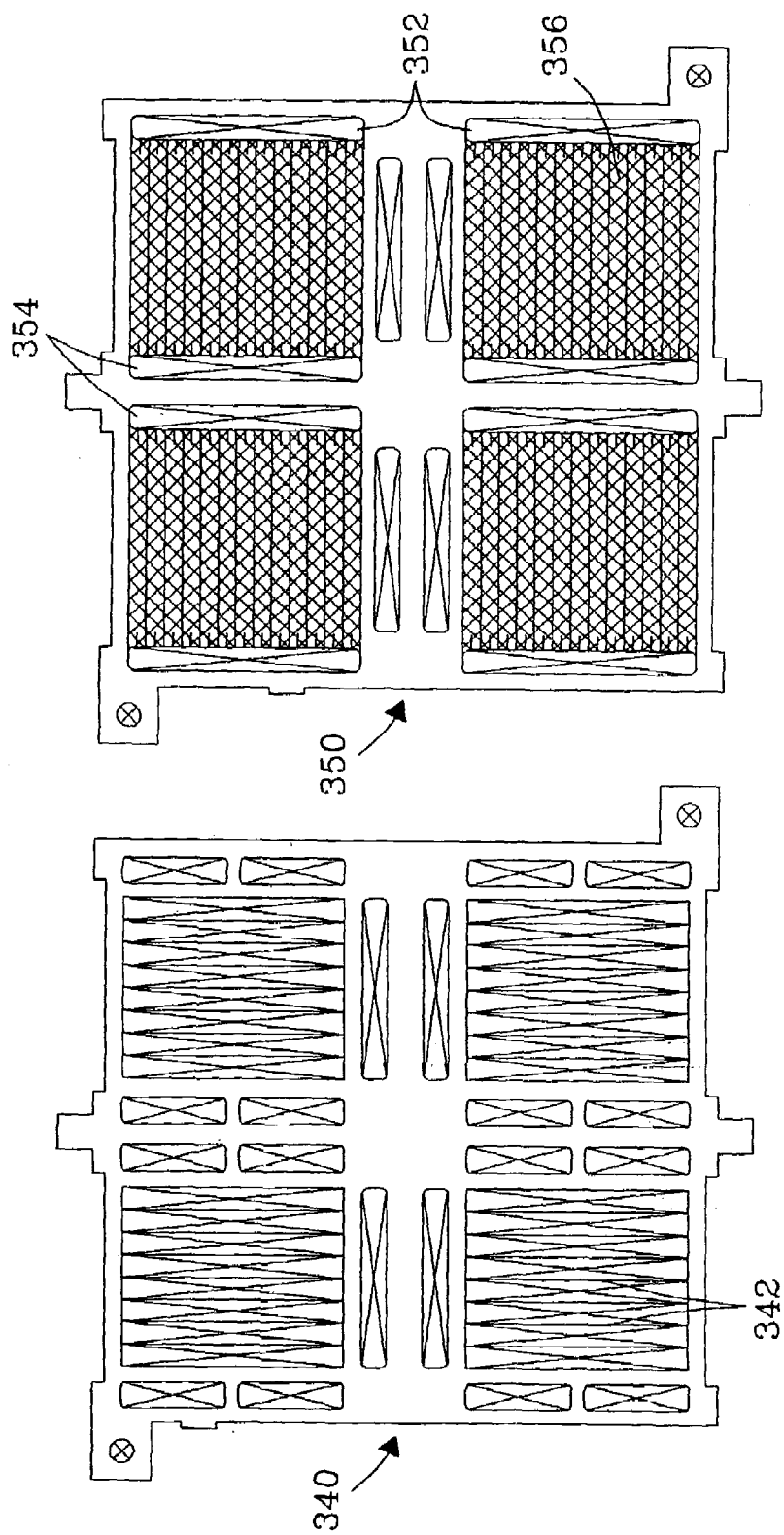
FIG. 15c is a top down view of a spacer shim in the reaction chamber layer.
FIG. 15d is a top down view of a shim in the heat exchanger layer of a reactor.
Figure 15E:
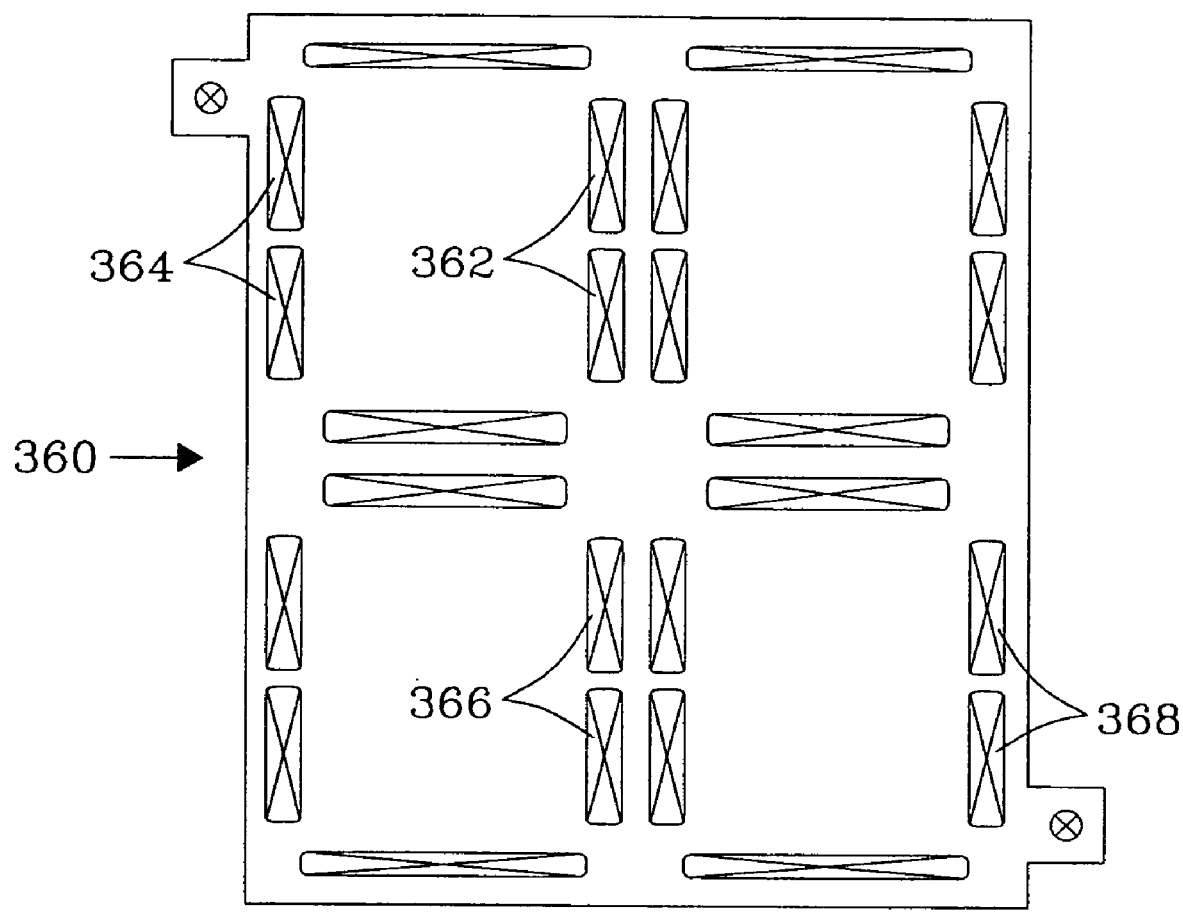
FIG. 15e is a top down view of an endplate of a reactor.
Figure 16A:
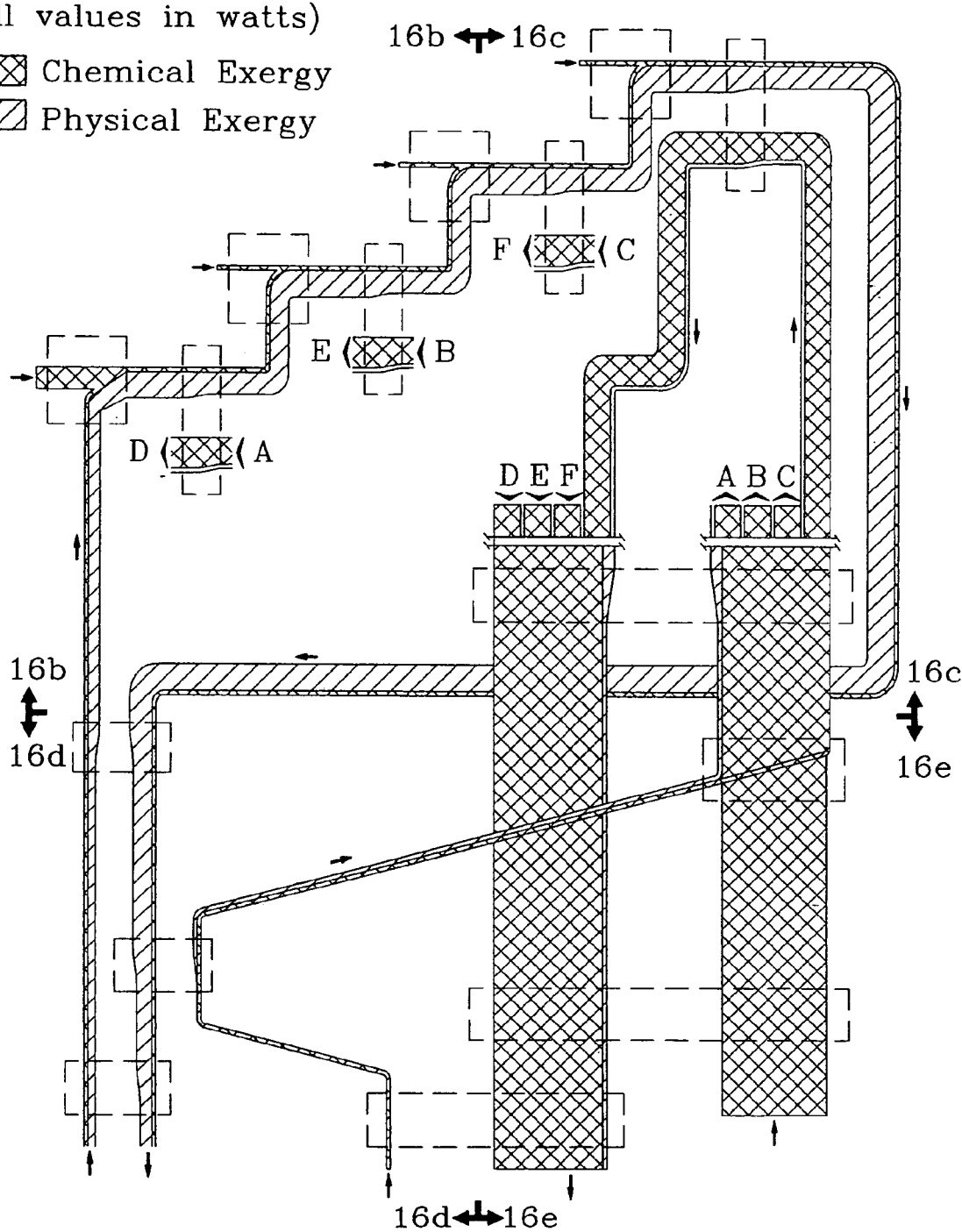
FIG. 16 is a diagram of exergy balance for a compact steam reforming unit.
Figure 16B:
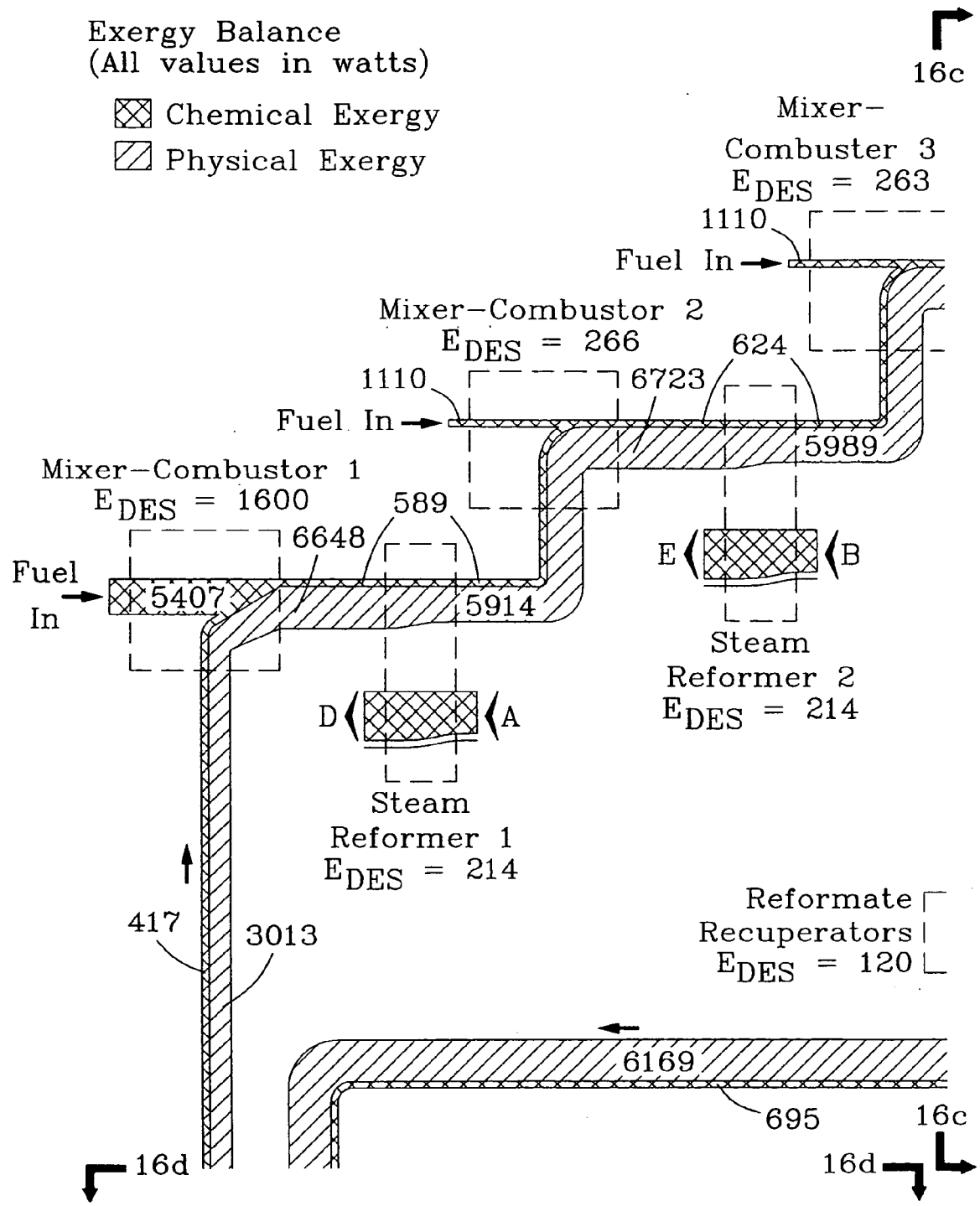
Figure 16C:
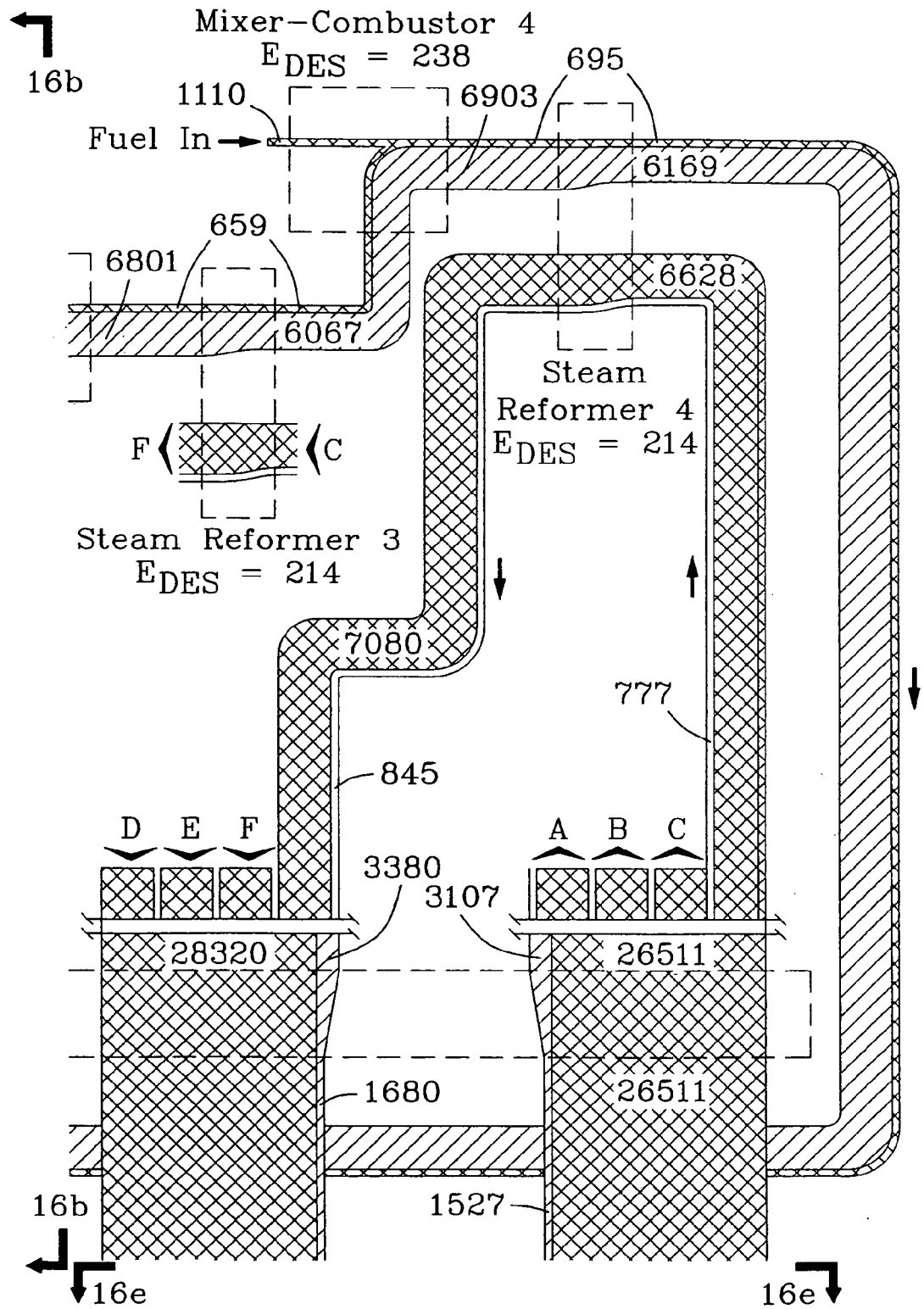
Figure 16D:
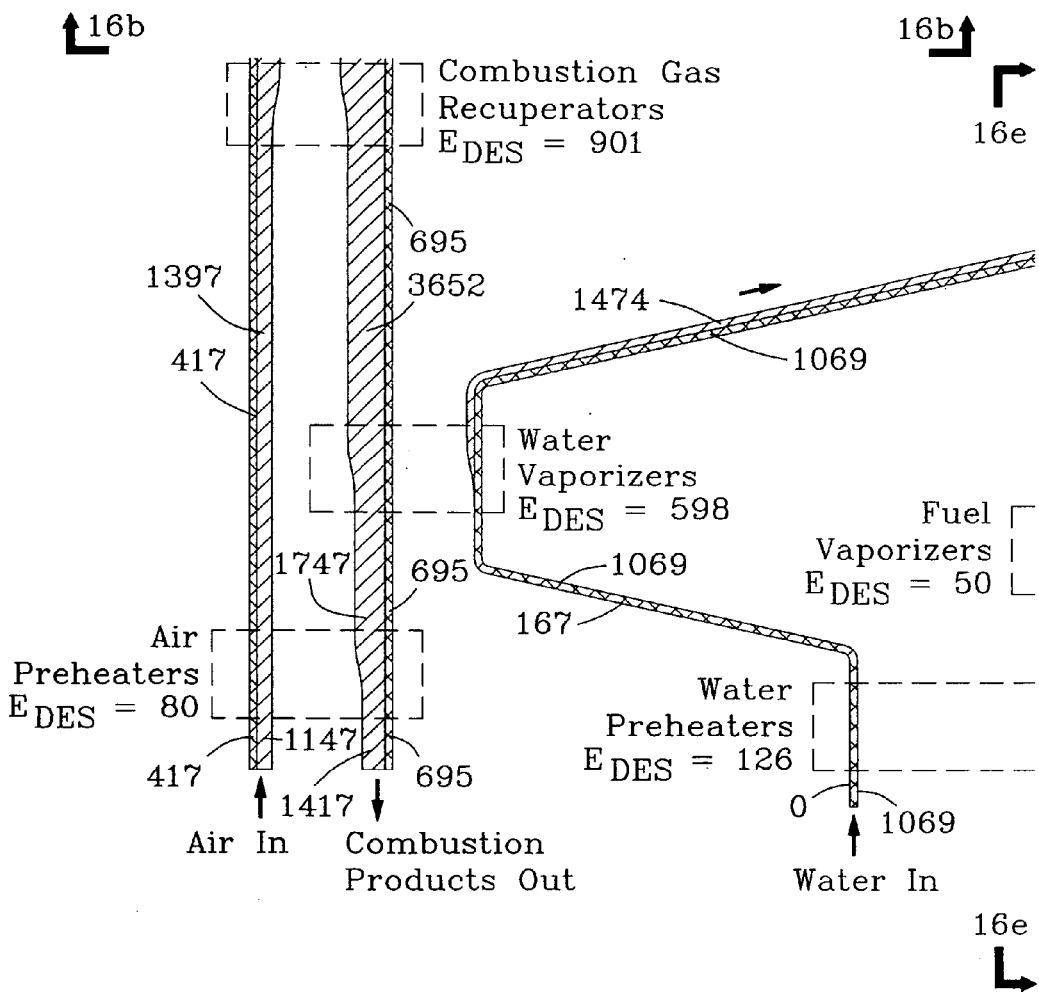
Figure 16E:
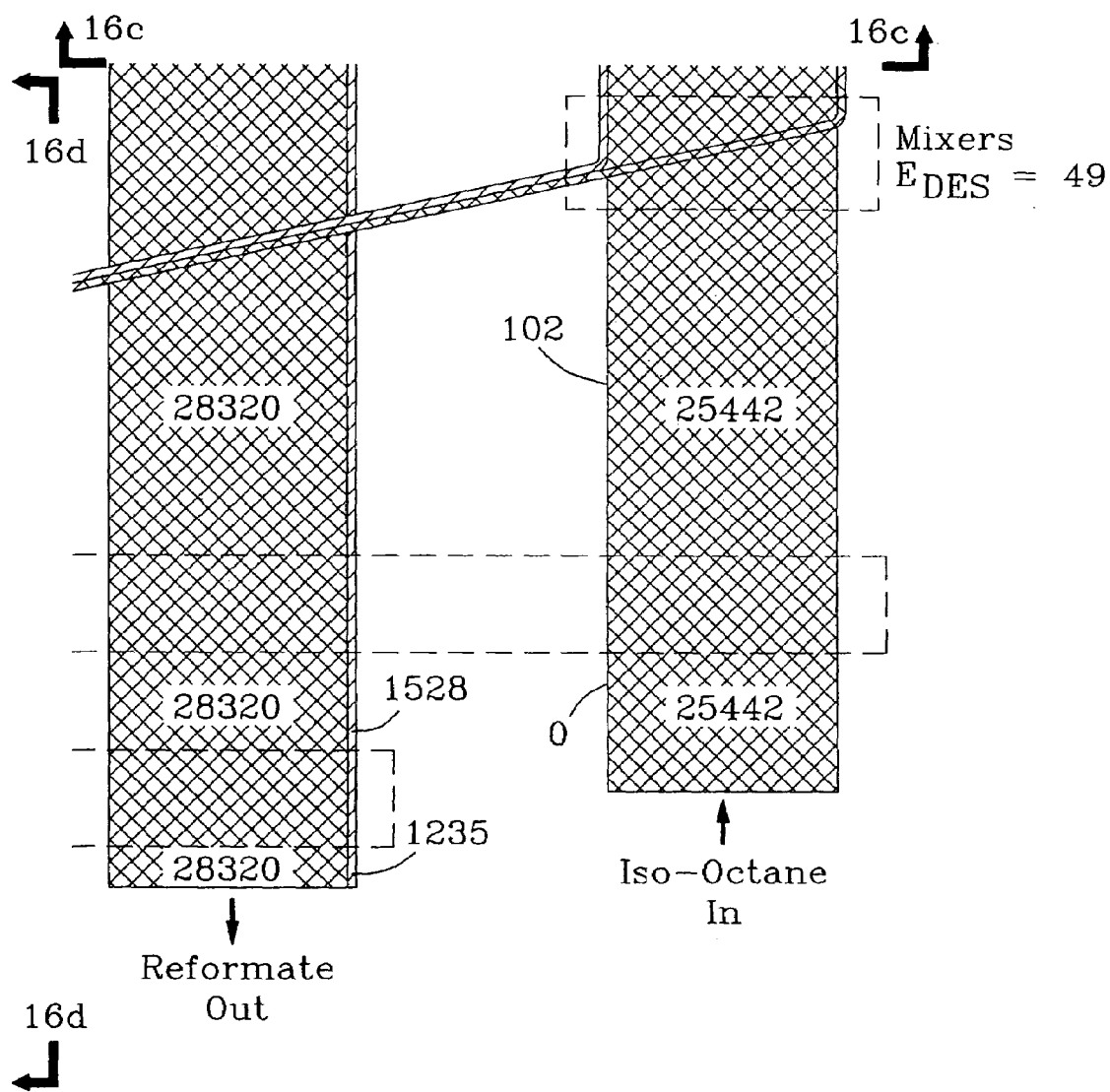
Figure 17A:
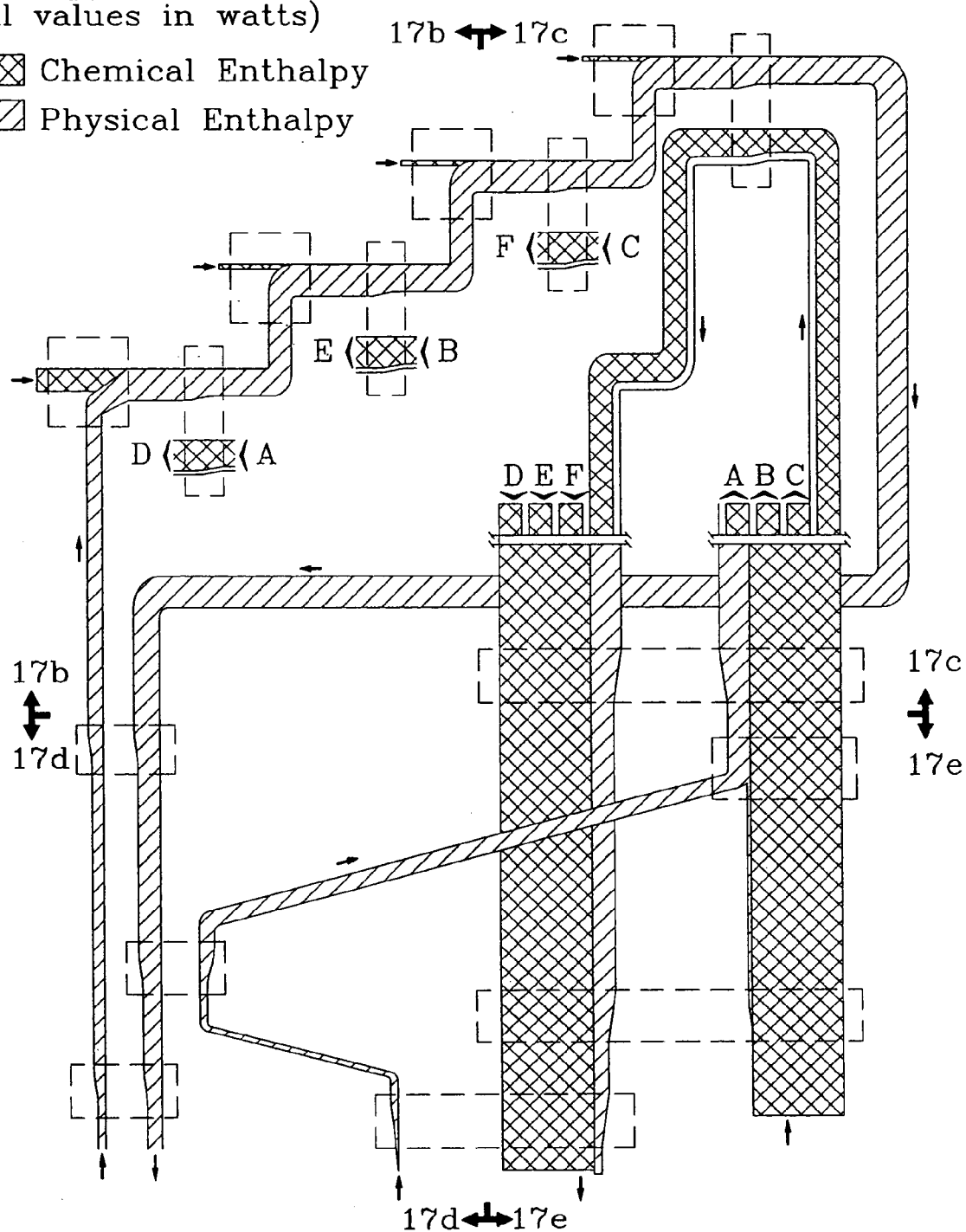
FIG. 17 is a diagram of enthalpy balance for a compact steam reforming unit.
Figure 17B:
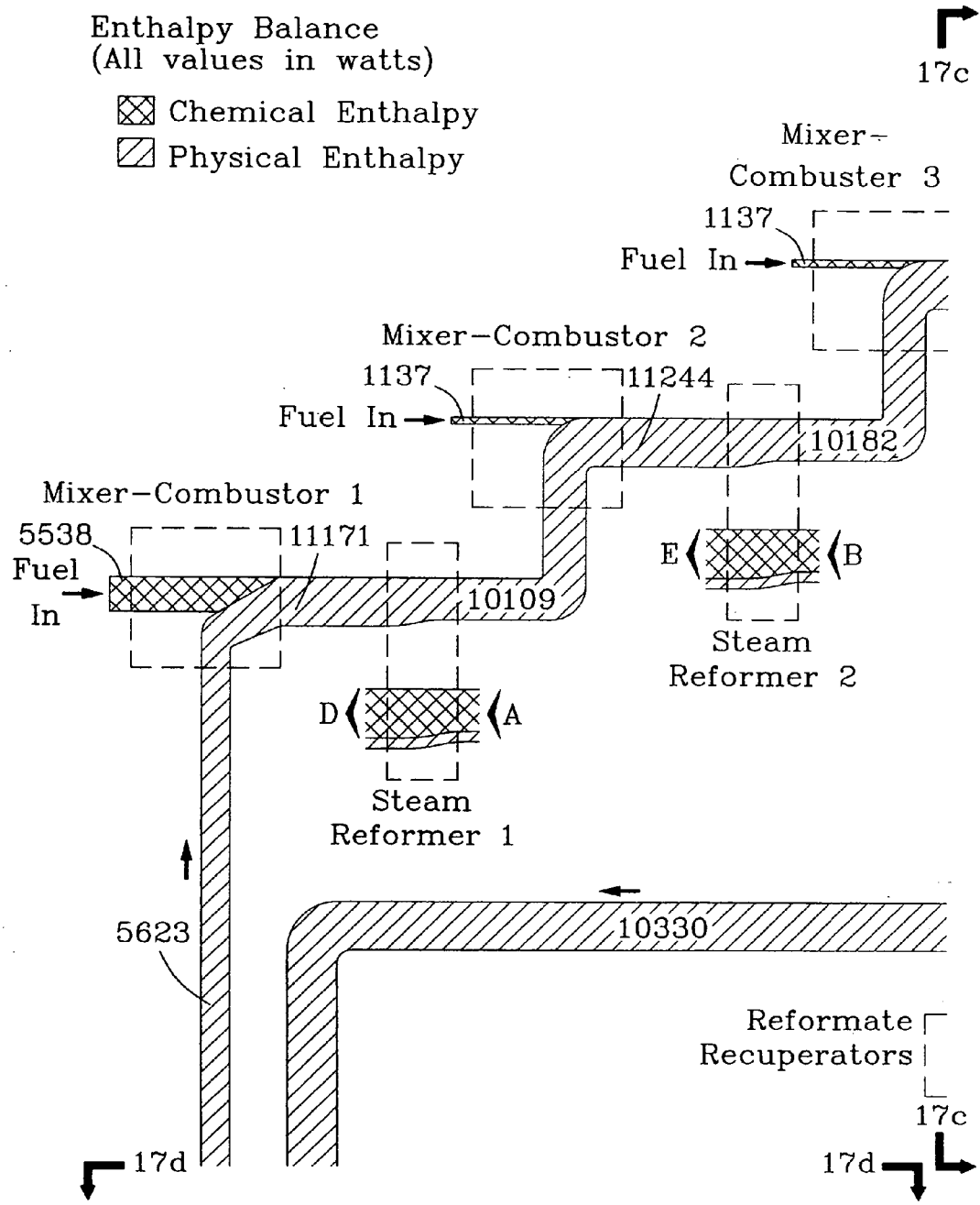
Figure 17C:
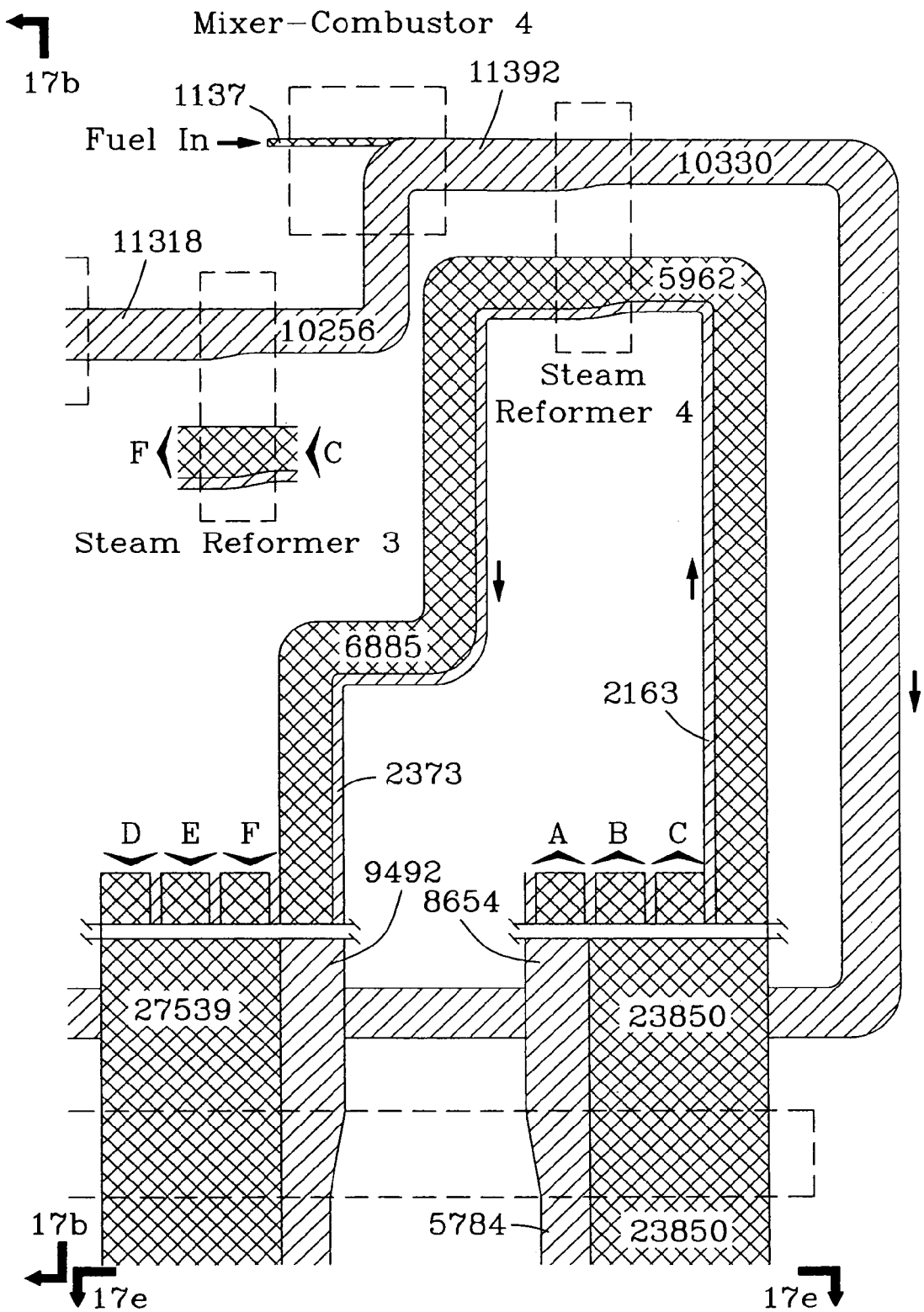
Figure 17D:
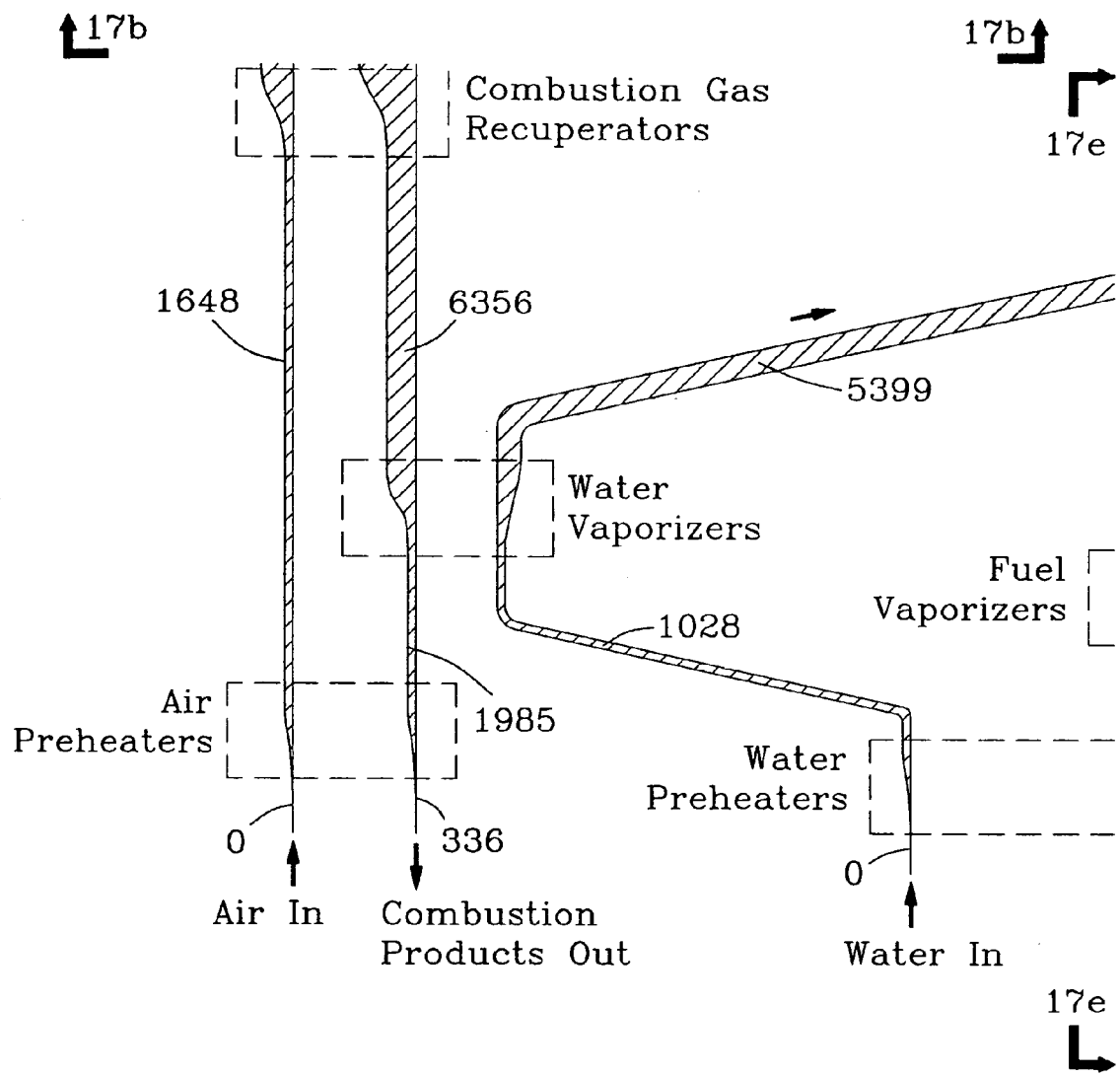
Figure 17E:
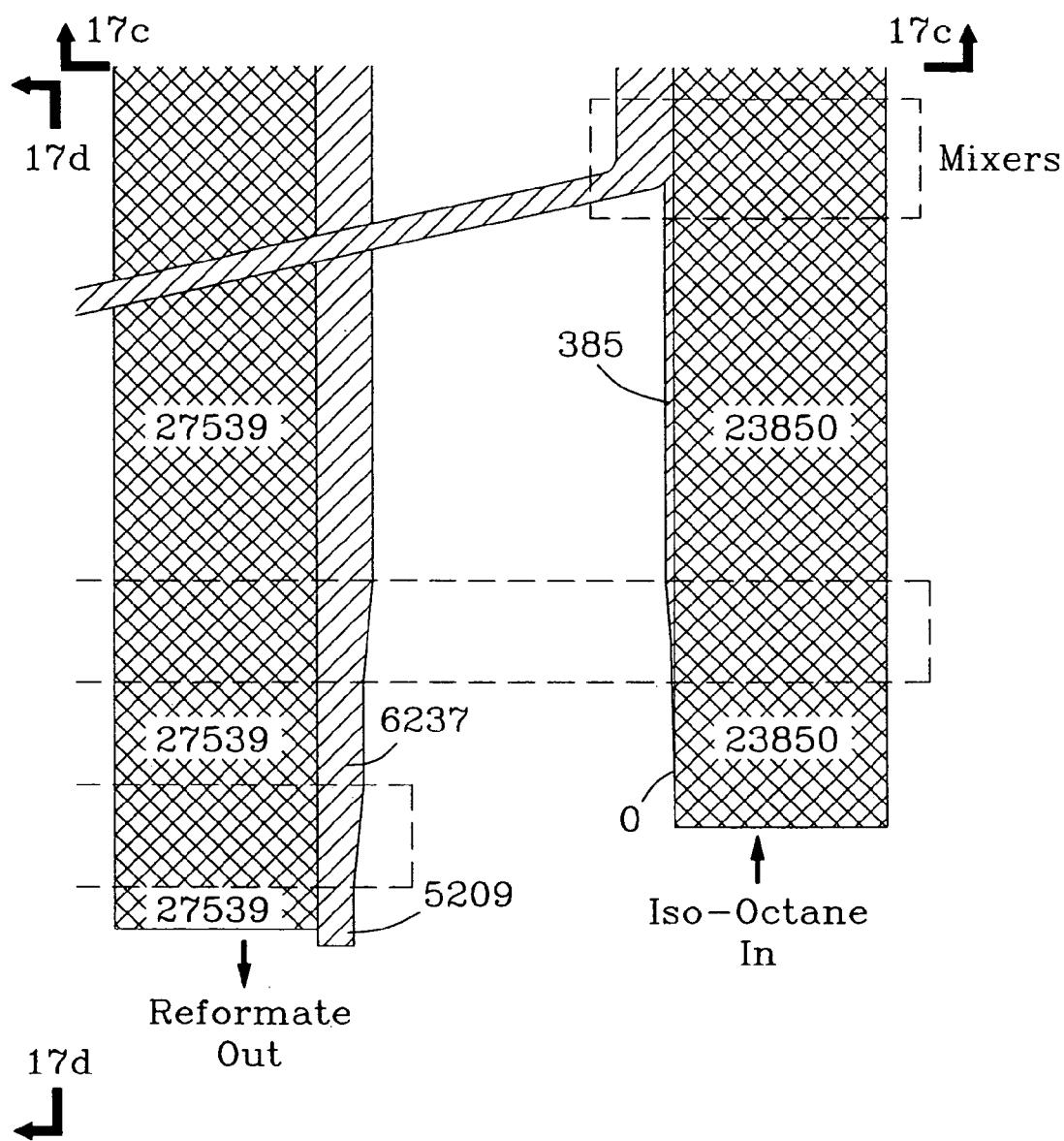

The shim construction for the reactor 114 is shown in FIGS. 15*a-e*. The reactor contained 75 reaction chamber layers alternating with 76 heat exchanger layers. Each reaction chamber layer consisted of a pair of mirror-image reaction chamber shims 300 separated by a spacer shim 340. The spacer shim had a 12 mil thickness. Each heat exchanger layer consisted of a pair of mirror-image heat exchanger shims 350. Cover plates 312 were welded on to create reactant channel 302. Reaction chamber 314 was formed by etching 5 mils into the shim while leaving a series of struts 322 and 324. The reaction chamber 300 and heat exchanger 350 shims were 20 mils thick. Each of the four identical reaction chambers was about 2 inches by 2 inches. The narrower, 5 mil struts 322 support catalyst strips while the thicker struts 324 align with wires 342 to provide structural supports. The wires 342 had a thickness of 12 mil and a width of 10 mil. The "X"s in FIG. 15c indicate empty spaces. These spaces are occupied by strips of catalyst felts (2.1 inch long×0.25 inch wide and 10-12 mil thick). Preferred catalyst materials are described in U.S. Pat. Nos. 6,440,895 and 6,616,909 incorporated herein by reference. The heat exchanger shims contained combustion gas inlets 354 and combustion gas outlets 352, and four sets of flow microchannels 356. The endblocks are usually thicker than the individual shims, typically 0.25 to 0.35 inch thick. One end block is a featureless metal sheet. The other end block 360 is illustrated in FIG. 15e.

During operation, reactants enter from the reactant channel 302 into reaction chamber 314. Products are formed in the reaction chamber and flow out through outlets 304. At the same time, combustant gases enter the heat exchanger layers through inlets 308, 354, flow through heat exchanger microchannels 356 and exit through outlets 352, 306, 310. While the flow of reactants and products are in parallel, the flow of combustant gases is in series. In one preferred embodiment for steam reforming, combustion gases enter holes 362 at 725C move through the heat exchanger and exit holes 364 at 650C. The gases are carried through an exterior pipe (not shown) and hydrogen gas is injected into the pipe to raise the temperature of the gases to 725C before reentering the reactor through inlet 366. This process is repeated until the combustant gases exit the fourth cell of the reactor at outlet 368 at 650C and travel on to recuperative heat exchanger 120.

The reactor provides numerous desirable characteristics including compactness, durability and the ability to conduct a thermal reaction over a relatively narrow temperature range. The reactor provides an integral design having multiple reaction chambers on a single layer in combination with heat exchange. In preferred embodiments, the heat exchange layers and the reaction chamber layers each have a thickness of 0.1 to 2 mm. In another preferred embodiment, more than 3, more preferably more than 10, alternating layers of heat exchangers and reaction chambers are combined on a single device. It can be seen that in a preferred embodiment, heat exchanger fluid flows from one heat exchanger to a second heat exchanger within the same integrated device. The reaction chambers preferably have a height, from top to bottom of the reaction chamber of 0.05 to 1 mm—which is advantageous for heat and mass transfer. The reactors can also be characterized by their properties such as the reaction productivities per unit volume and/or the thermal power density (in W per cc) achieveable in these systems.

An exergy analysis was performed of the Compact Microchannel Steam Reforming Unit, based on a ChemCad simulation of the system assuming that it is well-insulated (that is, no heat losses from individual components to the environment). In general, the method of Bejan, Tsatarnis and Moran (1996) was used, with ChemCad supplying the following: temperatures, pressures, mass and molar flow rates, by constituent chemical, for reactants and products (including the heating stream), enthalpy and entropy differences for each fluid on a component-by-component basis, heat of reactions (for combustion and steam reforming), specific heat values per stream, on a component by component basis, molecular weights, and component heat rates (watts). The physical characteristics of the environment (or "dead state") was taken to be 25° C., 1 bar. Chemical exergies were taken from Table C.2. of Bejan, Tsatarnis and Moran (1996).

For the reformer only, the entropy difference of the reforming stream was calculated using ideal gas rules and the assumption of specific heats. The system that was modeled included an air preheater. For mixers, entropy differences and exergetic destruction values were calculated by the method described in Bejan (1996)

As previously noted, the exergetic efficiency ($\epsilon_{2nd\ Law}$), or Second Law Efficiency, of a component, subsystem, or system is defined to be the ratio of the change in exergy of the product stream(s) to the change in exergy of the exergy providing stream(s).

EXAMPLE EXERGY ANALYSIS OF THE
MICROCHANNEL STEAM REFORMING UNIT

Calculations were performed for the compact microchannel steam reforming unit, designed to provide a hydrogen-rich stream for a 10 kWe fuel cell, with input assumptions including that the iso-octane and water streams are fed into the system at 5 bar, and the air stream is fed into the system at 2.5 bar. Individual cases included assumptions of substantial pressure drops and negligible pressure drops within individual components. It was further assumed that each component and connecting pipe are substantially insulated, so that heat losses to the environment are negligible.

As with the current design, the reforming stream is split into four parallel trains. The combustion stream, which provides heat for the endotheimic steam reforming reaction, likewise has four parallel process trains, but with the mixer/combustor/steam reformer sections being ortho-cascaded. For the exergy calculations, the surrounding environment was likewise taken to be standard temperature and pressure (i.e., 298 K, 1 bar).

FIGS. 16 and 17 present the Enthalpy Band and Exergy Band diagrams for the case with negligible pressure drop. Except where otherwise noted, the following description of the results is for the case where pressure drops are negligible.

FIG. 16 specifically presents the chemical and physical exergies for each point of each stream. Exergy values for the reforming stream are the same for each steam reformer, and are indicated only for the stream that passes through Steam Reformer 4. The exergy destruction estimates for each component are likewise identified.

The overall exergetic efficiency of the Compact Microchannel Steam Reforming Unit can be calculated through examination of the chemical and physical exergies of the heating and reforming streams, from FIG. 16.

For the heating stream:

| Input Streams | | Output Stream | |
|---|---|---|---|
| $E_{CH\text{-air}} =$ | 1147 | $E_{CH\text{-combprod}} =$ | 695 |
| $E_{PH\text{-air}} =$ | 417 | $E_{PH\text{-combprod}} =$ | 1417 |
| $E_{CH\text{-fuel}} =$ | 5407 | | |
| $E_{CH\text{-fuel}} =$ | 1110 | | |
| $E_{CH\text{-fuel}} =$ | 1110 | | |
| $E_{CH\text{-fuel}} =$ | 1110 | | |
| | 10301 | | 2112 |

$\Delta E_{driving} = 10301 - 2112 = 8189$ watts

For the reforming stream:

| Output Stream | | Input Streams | |
|---|---|---|---|
| $E_{CH\text{-}reformate} =$ | 28320 | $E_{CH\text{-}isooctane} =$ | 25442 |
| $E_{PH\text{-}reformate} =$ | 1235 | $E_{PH\text{-}isooctane} =$ | 0 |
| | | $E_{CH\text{-}water} =$ | 1069 |
| | | $E_{PH\text{-}water} =$ | 0 |
| | 29555 | | 26511 |

$\Delta E_{product} = 29555 - 26511 = 3044$ watts

The overall energetic efficiency of the Compact Microchannel Steam Reforming Unit is the change in exergy in the product stream (i.e., the steam reforming stream) divided by the change in exergy in the driving stream (i.e., the combustion stream), or $\epsilon_{2nd\ Law} = \Delta E_{product}/\Delta E_{driving} = 3044/8189 = 0.3717$ or 37.2%

For the calculation where moderate pressure drops were assumed throughout the unit, the overall energetic efficiency dropped to as low as 25%, due to additional exergy destruction through pressure drop (friction). These values compare to an overall energetic efficiency of about 30% for the synthesis gas production subsystem of an ammonia production plant, as originally presented by Cremer (H. Cremer, "Thermodynamic Balance and Analysis of a Synthesis Gas and Ammonia Plant," in *Thermodynamics: Second Law Analysis,* ed. R. A. Gaggioli, American Chemical Society, Washington, D.C., p. 111, 1980) and re-presented in Szargut (1984).

Consideration of Exergy Analysis for Ortho-Cascaded Mixer-Combustors and Steam Reformers There is a desire to keep the highest temperature in the system low enough so that stainless steel can be used. In the illustrated embodiment, this can be accomplished through the use of ortho-cascading.

In the current flowsheet, the highest temperature of any stream occurs with the combustion products that leave the Mixer-Combustor 1, at 725 C. Mixer-Combustor I also has the highest quantity of exergy destruction of any unit in the system, 1600 watts. The literature confirms that combustion is often a large source of exergy destruction, and in the case of the Mixer-Combustor 1, this is caused in part due to the relatively low temperature (400 C) of the air stream that enters the component.

Leaving the steam reformer, the combustion stream has only been dropped to 662 C, therefore allowing Mixer-Combustor 2 to require only about ⅕ as much fuel as was required for Mixer-Combustor 1. Mixer-Combustors 3 and 4 receive the same benefit.

The end effect is this: When considering the subsystem consisting of the Mixer-Combustor 1 and the Steam Reformer 1, the exergetic efficiency of this subsystem is only 22.3% (as can be calculated using the exergy values of Figure (b)). When adding Mixer-Combustors 2-4 and Steam Reformers 2-4, via the ortho-cascaded route, the subsystem expands, with an upward improvement in the exergetic efficiency of the subsystem, increasing it to 52.8%. Thus an ortho-cascaded approach allows the system to simultaneously increase the exergetic efficiency of the overall system while likewise allowing the system to be constructed from relatively inexpensive, stainless steel.

Consideration of Exergy Destruction and Exergetic Efficiency with Microchannel Steam Reformers FIG. 16 shows that, collectively, the Steam Reformers 1-4 destroy 852 watts of exergy. Within each steam reformer, a portion of the physical exergy of the combustion gas stream is initially transferred to the reforming stream, creating an increase in its physical exergy, then a portion of its physical exergy is transformed into chemical exergy, as part of the catalytic steam reforming reaction. Generally, the exergetic efficiency of each steam reformer can be separately calculated based upon the definition of exergetic efficiency, using the information that is contained within FIG. 16 As an example, the exergetic efficiency of Steam Reformer 1 is as follows:

$\epsilon_{2nd\ Law} = (7080+845-6628-777)/(6648-5914) = 520/734 = 0.708$ or about 70.8%. The other steam reformers likewise operate with similar exergetic efficiencies. Since the destruction of exergy, in this case, is internal to an individual component, improvements to the exergetic efficiency of these units would have to be realized through internal design improvements.

Consideration of Exergy Destruction within the overall Compact Microchannel Steam Reforming Unit The cumulative exergy destruction of the system, totaling 5147 watts, can also be considered from FIG. 16. The principle contributors to exergy destruction within the unit are estimated to be the mixer-combustors, the combustion recuperators, the water vaporizers, and the steam reformers, with their collective exergy destruction being 4722 watts, or 91.7% of the cumulative exergy destroyed. Mixer-Combustor 1 provides the most exergy destruction, 1600 watts, or 31.1% of the total exergy that is destroyed.

The Combustion Gas Recuperators have the second highest amount of exergy destruction. Air enters these units at 137 C, and is heated to 400 C by the combustion gases, which drop from 654 C to 427 C while providing 3974 watts (physical enthalpy from FIG. 17) to the air stream. These units operates across a large temperature range (654−137=517 C), and has large terminal temperature differences (respectively, 427−137 at the low temperature end of the heat exchanger, and 654−400 at the high temperature end), which contribute to a substantial amount of exergy destruction (901 watts). The Second Law efficiency, or exergetic efficiency, of this unit is calculated from the exergy values provided in FIG. 16 as follows:

$\epsilon_{2nd\ Law} = (3013-1397)/(6169-3652) = 0.642$ or 64.2%

By comparison, the Reformate Recuperators present a high degree of exergetic efficiency, with only 120 watts of exergy being destroyed within this unit. Here, steam and iso-octane enter the unit at 174 C, receiving heat from the reformate stream in the amount of 2870 watts (physical enthalpy), and increasing in temperature to 651 C. The reformate stream cools from 700 C to 252 C in this transaction. These units therefore also act across a large temperature difference (700−174=526 C), but have much smaller terminal temperature differences than with the Combustion Gas Recuperator. The exergetic efficiency of this unit is calculated to be:

$\epsilon_{2nd\ Law} = (3107-1527)/(3380-1680) = 0.929$ or 92.9%

The Combustion Gas Recuperators and the Reformate Recuperators have each been designed to be very compact heat exchangers, and each has been fabricated to be integral with at least one other set of heat exchangers.

Why are the Combustion Gas Recuperators so much less exergetically efficient than the Reformate Recuperators? The answer lies in the design of the entire unit, which for this embodiment has the combustion gas stream providing the heat for vaporizing water for the reforming stream. As is shown in FIG. 16, vaporizing the water requires 4371 watts of heat (thermal enthalpy), and in order to accomplish this, the combustion gases must leave the Combustion Gas Recuperators at a sufficient temperature (~427 C) to provide this.

The Water Vaporizers likewise suffer from poor exergetic efficiencies, as an unavoidable consequence of the fact that water does not increase in temperature as it boils. The result is that the Water Vaporizers likewise have a large terminal temperature difference at the hot end of the units (combustion gases enter at 427 C, whereas steam leaves at 160 C), and a total of 598 watts of exergy is estimated to have been destroyed in this unit.

In any thermo-chemical system, the exergetic efficiencies of various units are often not truly independent of each other. For the system at hand, since the Combustion Gas Recuperator must be allowed to only partly make use of its exergy for preheating the air stream, the Mixer-Combustor 1 must accomplish the rest of the air heating requirement, and it therefore requires substantially greater fuel than the other Mixer-Combustors (2-4) in the ortho-cascaded train (5538 watts of chemical enthalpy for Mixer-Combustor 1 as opposed to 1137 watts of chemical enthalpy for Mixer-Combustors 2-4 each). Thus, the need to vaporizer water has also accounted for a large degree of the exergy that is destroyed within Mixer-Combustor 1.

What is apparent from this assessment is that, in the present embodiment of the Compact Microchannel Steam Reforming Unit, the sequence of Water Vaporizers, Combustion Gas Recuperators, and Mixer-Combustor 1 provides for the greatest amount of exergy destruction (3099 watts, or 60.2% of the exergy destroyed). Accordingly, alternate system configurations should be explored that might improve the overall exergetic efficiency of the system.

As a first consideration, the Exergy Band diagram of Figure (b) shows that the physical exergy of the combustion gas stream is at 6169 watts after leaving Steam Reformer 4. In principle, this means that if the combustion gas stream were reversibly brought into physical equilibrium with the surrounding environment, it could provide up to 6169 watts of work (e.g., shaft work). This is a large value compared to the 10 kWe of electricity output that is desired from the fuel cell. While no system is truly reversible, expansion units such as turbines and scroll expanders are often exergetically efficient (80% or higher).

In order to accommodate this option, additional chemical enthalpy would need to be added in the system, presumably at Mixer-Combustor 1 or prior to Mixer-Combustor 1. From Figure (a), it is observed that the chemical enthalpy that would need to be added is 3974 watts (to replace the Combustion Gas Recuperators), 4371 watts (to replace the Water Vaporizers), and 1648 watts (to replace the Air Preheaters), for a total of 9993 watts. Assuming that we were able to accomplish this, and assuming an 80% efficient expansion device, then the ratio of additional work to additional heat required is $$0.80 \times 6169/9993 = 0.494, \text{ or } 49.4\%$$

In actuality, an 80% efficient expansion device would result in the effluent stream of combustion gases being hot enough to provide some preheating of the combustion air, so the efficiency with which the new work would be provided is somewhat higher.

Further observing that the physical exergy of the combustion gas stream drops from 6169 watts to 3652 watts across the Combustion Gas Recuperators, then to 1747 watts across the Water Vaporizers, other options present themselves. For example, taking the same approach as in the preceeding paragraphs, replacing only the Combustion Gas Recuperators with an 80% efficient expansion device would provide $0.80 \times (6169-3652)$ watts, or 2014 watts (shaft work). This is somewhat lower than in the previous alternative, but as the additional heat to replace the Combustion Gas Recuperators is only 3974 watts, the incremental energy efficiency is $$0.80 \times (6169-3652)/3974 = 0.507, \text{ or } 50.7\%.$$

This value is only slightly higher, but it avoids the problem of finding additional heat for the water vaporizer.

Overall, the system could be revised in a number of ways, for better exergetic efficiency, if a better source of heat can be found for vaporizing water. Exergetic considerations here provide another opportunity, which takes into account the observation that the Compact Microchannel Steam Reforming Unit is designed for a system that includes a fuel cell plus other gas processing/conditioning hardware.

In particular, it is observed that a 10 kWe fuel cell will generate substantial waste heat. For example, a Proton-Exchange Membrane (PEM) fuel cell will operate at about 80 C, with about 60% efficiency (first law). The result is that there is about 6000-7000 watts of heat available from the PEM fuel cell at about 80 C. The temperature of this heat source is too low for it to provide for direct vaporization of water at 150-160 C, however, it can be upgraded via the use of a heat pump.

From a Second Law perspective, upgrading the heat from the fuel cell will require the use of exergy. For a reversible heat pump, operating between 80 C and 160 C, the Coefficient of Performance (COP) can be calculated to be:

$$COP = (160+273)/(160-80) = 5.41$$

thus suggesting that the reversible heat pump needs $4371/5.41 = 808$ watts of exergy, or shaft work, in order to operate. A conservative assumption would put this at, say, 25% higher, or $808 \times 1.25 = 1010$ watts.

Using energy from the fuel cell to vaporizer water would allow redesign of the Combustion Gas Recuperators and the Mixer-Combustor 1, so that they operate with considerably better exergetic efficiency. Conservatively assuming that the redesigned Combustion Gas Recuperators only destroy, say, 200 watts (as opposed to 120 watts of exergy destroyed in the Reformate Recuperators), and that the redesigned Mixer-Combustor 1 likewise destroys, say, 400 watts (as opposed to 266, 263 and 238 watts of destroyed exergy in Mixer-Combustors 2 through 4), a total of 600 watts of exergy would be destroyed. The resulting exergy savings is $1600+901+598-200-400=2499$ watts.

In this case, we have gained $2499-1010=1489$ watts of exergy, compared to the 10 kWe output that otherwise was desired. A better design for the heat exchangers and combustors would likely cause this to increase. With this in mind, we could accordingly decrease the fuel consumption for a 10 kWe output, by at least $1.489/10 = 0.1489$ or about 15%.

CLOSURE

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An chemical process system comprising:
   a fuel cell;
   a heat pump; and
   a chemical conversion unit capable of producing fuel for the fuel cell;
   wherein, during operation, the fuel cell produces heat at a first temperature;
   wherein, during operation, the heat pump increases the temperature of said heat to a higher temperature; and
   wherein, during operation, heat from the heat pump is transferred to said chemical conversion unit in a microchannel heat exchanger,
   wherein, when tested with nitrogen gas at inlet temperatures of about 23-26° C. and outlet temperatures ranging from 188 to 473° C. on the heat receiving side and inlet temperatures of 220-575° C. and outlet temperatures ranging from 61 to 145° C. on the heat rejecting side, the microchannel heat exchanger operates with an exergetic efficiency of at least 80%.

2. The chemical process system of claim 1 wherein said fuel cell is a proton exchange membrane fuel cell.

3. The chemical process system of claim 1 wherein said heat pump comprises a compressor.

4. The chemical process system of claim 1 wherein said chemical conversion unit comprises a steam reformer and wherein the heat transferred to the steam reformer is used to vaporize water.

5. The chemical process system of claim 4 wherein the fuel cell oxidizes hydrogen gas.

6. The chemical process system of claim 2 wherein said heat pump comprises a compressor.

7. The chemical process system of claim 1 wherein the microchannel heat exchanger is an interleaved heat exchanger.

8. The chemical process system of claim 1 wherein the microchannel heat exchanger operates with an exergetic efficiency of 80% to 95%.

9. The chemical process system of claim 1 wherein the chemical conversion unit comprises a steam reformer with integrated heat exchange.

10. The chemical process system of claim 9 wherein the steam reformer is a laminated device with alternating layers of reaction chamber layers and heat exchange layers.

11. The chemical process system of claim 10 wherein the alternating layers of reaction chamber layers and heat exchange layers each have a thickness of 0.1 to 2 mm.

12. The chemical process system of claim 11 wherein the steam reformer comprises at least 10 alternating layers of reaction chamber layers and heat exchange layers.

13. The chemical process system of claim 1 wherein the microchannel heat exchanger comprises a water vaporizer.

14. The chemical process system of claim 2 wherein the microchannel heat exchanger comprises a water vaporizer.

15. A chemical process comprising:
    an apparatus comprising
       a fuel cell;
       a heat pump; and
       a chemical conversion unit capable of producing fuel in the chemical conversion unit and passing the fuel into the fuel cell;
    wherein the fuel cell produces an effluent;
    passing the effluent at a first temperature passes into the heat pump, wherein the heat pump increases the temperature of the effluent to a higher temperature; and
    transferring heat from the effluent at the higher temperature to the chemical conversion unit in a microchannel heat exchanger with an exergetic efficiency of at least 80%.

16. The chemical process of claim 15 wherein the microchannel heat exchanger operates with an exergetic efficiency of 80% to 95%.

17. The chemical process of claim 15 wherein a fluid is compressed in the heat pump.

18. The chemical process of claim 15 wherein said chemical conversion unit comprises a steam reformer and wherein the heat transferred to the steam reformer is used to vaporize water.

19. The chemical process of claim 15 wherein hydrogen gas is oxidized in the fuel cell.

* * * * *